US 8,473,925 B2
Jun. 25, 2013

(12) United States Patent
Gagliardi et al.

(54) CONDITIONAL DYNAMIC INSTRUMENTATION OF SOFTWARE IN A SPECIFIED TRANSACTION CONTEXT

(75) Inventors: Marco Gagliardi, Brisbane, CA (US); Yitao Sun, Taipei (TW)

(73) Assignee: CA, Inc., Islandia, NY (US)

( * ) Notice: Subject to any disclaimer, the term of this patent is extended or adjusted under 35 U.S.C. 154(b) by 536 days.

(21) Appl. No.: 12/777,490

(22) Filed: May 11, 2010

(65) Prior Publication Data

US 2011/0283263 A1 Nov. 17, 2011

(51) Int. Cl.
*G06F 9/44* (2006.01)
*G06F 11/00* (2006.01)

(52) U.S. Cl.
USPC ............................................ 717/130; 714/35

(58) Field of Classification Search
None
See application file for complete search history.

(56) References Cited

U.S. PATENT DOCUMENTS

| | | | |
|---|---|---|---|
| 5,689,709 A | 11/1997 | Corbett et al. |
| 6,470,494 B1 | 10/2002 | Chan et al. |
| 6,985,909 B2 | 1/2006 | Blohm |
| 7,017,155 B2 | 3/2006 | Peev et al. |
| 7,058,957 B1 | 6/2006 | Nguyen |
| 7,206,807 B2 | 4/2007 | Cheenath |
| 7,293,260 B1 | 11/2007 | Dmitriev |
| 7,398,533 B1 | 7/2008 | Slaughter et al. |
| 7,469,262 B2 | 12/2008 | Baskaran et al. |
| 7,483,927 B2 | 1/2009 | Anglin et al. |
| 7,546,593 B2 | 6/2009 | Petev et al. |
| 7,571,427 B2 | 8/2009 | Wang et al. |
| 7,614,045 B2 | 11/2009 | Kuck et al. |
| 2002/0199172 A1 | 12/2002 | Bunnell |
| 2003/0115584 A1 | 6/2003 | Fahs et al. |
| 2003/0149960 A1 | 8/2003 | Inamdar |
| 2003/0163608 A1 | 8/2003 | Tiwary et al. |
| 2004/0078691 A1 | 4/2004 | Cirne et al. |
| 2004/0133882 A1 | 7/2004 | Angel et al. |
| 2004/0163077 A1 | 8/2004 | Dimpsey et al. |
| 2004/0230956 A1 | 11/2004 | Cirne et al. |
| 2005/0039172 A1 | 2/2005 | Rees et al. |
| 2005/0261879 A1 | 11/2005 | Shrivastava et al. |

(Continued)

FOREIGN PATENT DOCUMENTS

WO 2009/095741 A1 8/2009

OTHER PUBLICATIONS

Extended European Search Report dated Dec. 19, 2011, European Patent Application No. 11250847.8.
U.S. Appl. No. 12/903,102, filed Oct. 12, 2010.

(Continued)

*Primary Examiner* — Hyun Nam
(74) *Attorney, Agent, or Firm* — Vierra Magen Marcus LLP

(57) ABSTRACT

Techniques for analyzing software in which un-instrumented components can be discovered and conditionally instrumented during a runtime of the software. Initially, software such as an application can be configured with a baseline set of instrumented components such as methods. As the application runs, performance data gathered from the instrumentation may indicate that the performance of some methods is below expectations. To analyze this, any methods which are callable from a method at issue are discovered, such as by inspecting the byte code of loaded classes in a JAVA Virtual Machine (JVM). To limit and focus the diagnosis, the instrumentation which is added to the discovered components can be conditional, so that the instrumentation is executed only in a specified context. The context can involve, e.g., a specified sequence of components in which a discovered component is called, and/or transaction data in which a discovered component is called.

20 Claims, 17 Drawing Sheets

U.S. PATENT DOCUMENTS

| | | | |
|---|---|---|---|
| 2005/0273667 | A1 | 12/2005 | Shrivastava et al. |
| 2005/0273787 | A1 | 12/2005 | Kovachka-Dimitrova et al. |
| 2006/0174226 | A1 | 8/2006 | Fair et al. |
| 2007/0150870 | A1 | 6/2007 | Fitch et al. |
| 2007/0168998 | A1 | 7/2007 | Mehta et al. |
| 2007/0234307 | A1* | 10/2007 | Luk et al. ............... 717/130 |
| 2008/0034352 | A1 | 2/2008 | McKinney et al. |
| 2008/0148242 | A1 | 6/2008 | Cobb et al. |
| 2008/0222614 | A1 | 9/2008 | Chilimbi et al. |
| 2008/0276227 | A1 | 11/2008 | Greifeneder |
| 2008/0288212 | A1 | 11/2008 | Greifeneder |
| 2008/0288962 | A1 | 11/2008 | Greifeneder |
| 2009/0112667 | A1 | 4/2009 | Blackwell et al. |
| 2009/0144305 | A1 | 6/2009 | Little |
| 2009/0254889 | A1* | 10/2009 | Prasadarao ............... 717/130 |
| 2009/0320045 | A1 | 12/2009 | Griffith et al. |
| 2010/0257603 | A1 | 10/2010 | Chander et al. |

OTHER PUBLICATIONS

Dmitriev, "Design of JFluid: A Profiling Technology and Tool Based on Dynamic Bytecode Instrumentation," SMLI TR-2003-125, Nov. 17, 2003, Sun Microsystems, Inc., pp. 1-19.
Binder et al., "Advanced Java Bytecode Instrumentation," PPPJ 2007, Sep. 5-7, 2007, Lisboa, Portugal. Copyright 2007 ACM.
Preliminary Amendment dated Apr. 25, 2011, U.S. Appl. No. 12/777,496, filed May 11, 2010.
Response to Extended European Search Report dated May 16, 2012, European Patent Application No. 11250521.9.
Extended European Search Report dated Aug. 16, 2011, European Patent Application No. 11250520.1-1225.
Morajko et al., "Design and implementation of a dynamic tuning environment," Journal of Parallel and Distributed Computing, vol. 67, No. 4, Mar. 24, 2007, pp. 474-490.
Extended European Search Report dated Sep. 1, 2011, European Patent Application No. 11250522.7-1225.
Extended European Search Report dated Sep. 19, 2011, European Patent Application No. 11250521.9-1225.
Response to Search Opinion dated Sep. 5, 2012, European Application No. 11250520.1-1225.
Response to Search Opinion dated Oct. 16, 2012, European Patent Application No. 11250847.8.
Response to the Search Opinion of the Extended European Search Report dated Oct. 28, 2011, European Application No. 11250522.7.
Non-Final Office Action dated Dec. 28, 2012, U.S. Appl. No. 12/777,496, filed May 11, 2010.
Non-Final Office Action dated Jan. 2, 2013, U.S. Appl. No. 12/777,506, filed May 11, 2010.
Non-Final Office Action dated Jan. 17, 2013, U.S. Appl. No. 12/903,102, filed Oct. 12, 2010.
Mirgorodskiy, Alexander V., et al., "CrossWalk: A tool for performance profiling across the user-kernel boundary," Advances in Parallel Computing, vol. 13, 2004, pp. 745-752.
U.S. Appl. No. 12/777,496, filed May 11, 2010.
U.S. Appl. No. 12/777,506, filed May 11, 2010.
Response to Office Action dated Mar. 27, 2013, U.S. Appl. No. 12/777,496, filed May 11, 2010.
Response to Office Action dated Apr. 1, 2013, U.S. Appl. No. 12/777,506, filed May 11, 2010.
Response to Office Action datd Apr. 17, 2013, U.S. Appl. No. 12/903,102, filed Oct. 12, 2010.

* cited by examiner

Discovered components

Discovered components

Fig. 8J

| Thread Local Cache |||
|---|---|
| Time: | Action: |
| t6 | Received from C4A: MethodName=C4A; ExecutionStatus=Executing |
| t7 | Received from C5: MethodName=C5; ExecutionStatus=Executing |
| t8 | Received from C6A: MethodName=C6A; ExecutionStatus=Executing |
| t9 | Received from C6A1: Retrieve ExecutionStatus for MethodName=C4A, C5 and C6A<br>→Context met<br>→Conditional instrumentation for C6A1 executes |
| t16: | Received from C6A: Remove ExecutionStatus for MethodName=C6A |
| t17: | Received from C5: Remove ExecutionStatus for MethodName=C5 |
| t18: | Received from C4A: Remove ExecutionStatus for MethodName=C4A |

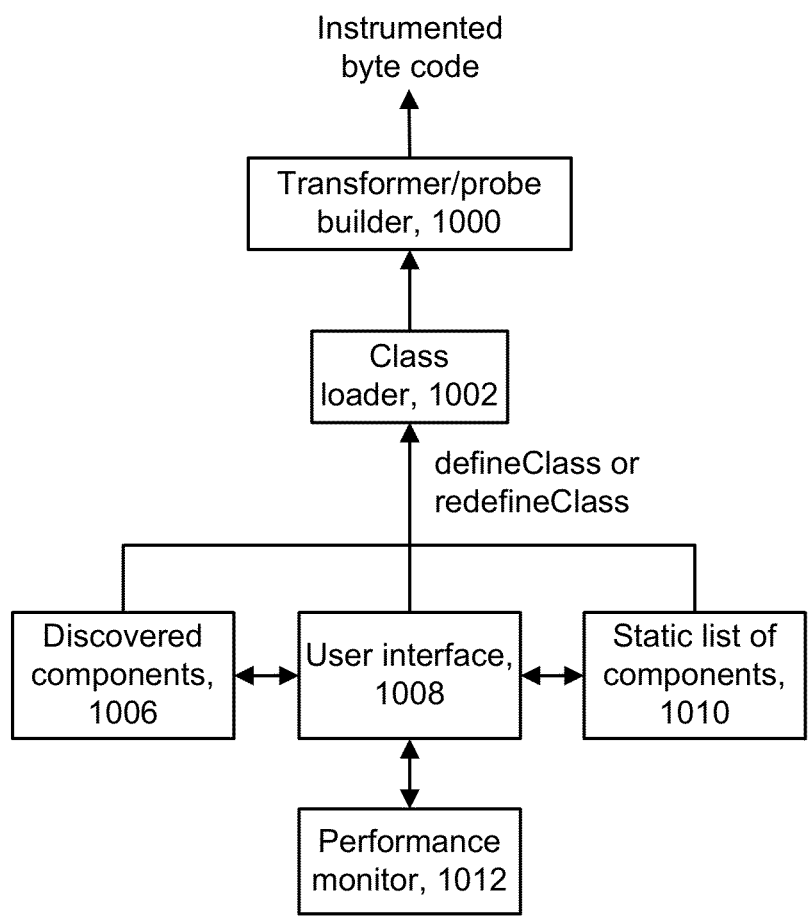

CONDITIONAL DYNAMIC INSTRUMENTATION OF SOFTWARE IN A SPECIFIED TRANSACTION CONTEXT

BACKGROUND OF THE INVENTION

1. Field of the Invention

The present invention is directed to technology for monitoring software in a computing environment.

2. Description of the Related Art

The growing presence of the Internet as well as other computer networks such as intranets and extranets has brought many new applications in e-commerce, education and other areas. Organizations increasingly rely on such applications to carry out their business or other objectives, and devote considerable resources to ensuring that they perform as expected. To this end, various application management techniques have been developed.

One approach involves monitoring the infrastructure of the application by collecting application runtime data regarding the individual software components that are invoked in the application. This approach can use agents that essentially live in the system being monitored. For example, using instrumentation of the software, a thread or process can be traced to identify each component that is invoked, as well as to obtain runtime data such as the execution time of each component. Tracing refers to obtaining a detailed record, or trace, of the steps a computer program executes. One type of trace is a stack trace. Traces can be used as an aid in debugging. However, deciding which components to instrument can be problematic. An over inclusive approach can result in excessive overhead costs and possibly impair the operation of the application, while an under inclusive approach can result in the omission of important performance data. As a result, analysis and diagnosis of software can be problematic.

SUMMARY OF THE INVENTION

The present invention provides a technique for monitoring software which addresses the above and other issues.

In one embodiment, a computer-implemented method for instrumenting an application includes a number of computer-implemented steps. The steps include obtaining performance data from instrumented methods in the application. For instance this can include start and stop times of each method. The method further includes, based on the performance data, selecting at least one method of the instrumented methods to analyze in further detail, and based on the selecting, determining at least one callable method which can be called by the at least one selected method and which is un-instrumented. The method further includes, in response to the determining, providing conditional instrumentation for the at least one callable method, wherein the conditional instrumentation specifies a context in which the at least one callable method can be called.

In another embodiment, a computer-implemented method for instrumenting an application includes receiving information from instrumentation of at least one selected method of the application indicating that the at least one selected method starts executing, and based on the receiving, storing an indication in a memory resource that the at least one selected method is executing. For instance, the memory resource can be a thread-local cache. The method further includes receiving a request from conditional instrumentation of at least one called method of the application when the at least one called method is called by the at least one selected method. The request accesses, from the memory resource, the indication that the at least one selected method is executing. Moreover, the conditional instrumentation executes to report regarding an execution of the at least one called method, based at least partly on the accessed indication.

Another embodiment provides a tangible computer readable storage having computer readable software embodied thereon for programming at least one processor to perform a method for instrumenting an application. The method performed includes obtaining performance data from instrumented methods in an application, identifying at least one method of the instrumented methods to analyze in further detail, identifying at least one callable method which can be called by the at least one selected method and which is un-instrumented, and providing conditional instrumentation for the at least one callable method which determines whether a condition is met when the at least one callable method is subsequently called. The conditional instrumentation executes to provide performance data regarding execution of the at least one callable method based on determining that the condition is met, and the conditional instrumentation does not execute to provide performance data regarding execution of the at least one callable method based on determining that the condition is not met.

Corresponding methods, systems and computer- or processor-readable storage devices which include a storage media encoded with instructions which, when executed, perform the methods provided herein, may be provided.

BRIEF DESCRIPTION OF THE DRAWINGS

FIG. 8J depicts activities involving a thread-local cache, consistent with FIGS. 5B and 8I.

FIG. 10 depicts an example process flow for instrumenting software.

DETAILED DESCRIPTION

The present invention provides a technique for analyzing software in which un-instrumented components can be discovered and conditionally instrumented during a runtime of the software. Initially, software such as an application can be configured with a baseline set of instrumented components such as methods. As the application runs, performance data can be gathered from the instrumentation, and it may be learned that the performance of some methods is below expectations or is otherwise an issue. To analyze the problem, a technique can be used to discover any methods which are callable from the method at issue. In a particular implementation, the callable methods are discovered by inspecting the byte code of loaded classes in a JAVA Virtual Machine (JVM). A decision can then be made to instrument and/or report the discovered methods. By selectively adding instrumentation, additional performance data can be obtained from the discovered components to allow a deep diagnosis of a performance problem without initially requiring over-inclusive instrumentation. Furthermore, the instrumentation which is added to the discovered components can be conditional, so that the instrumentation is executed only in a specified context. The context can involve, e.g., a specified sequence of components in which a discovered component is called, and/or data of a transaction in which a discovered component is called. Thus, the goals of efficient and lightweight instrumentation can be achieved along with the capability for a deep diagnosis when needed.

Figure 1:
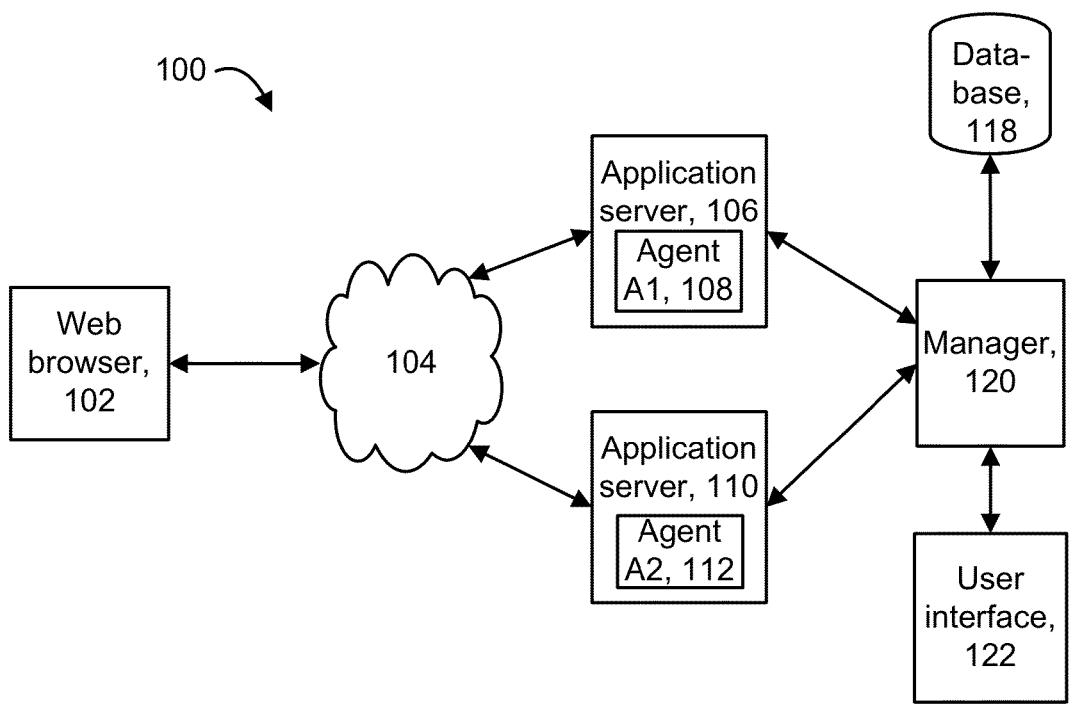
FIG. 1 depicts a system which includes a managed application.

FIG. 1 depicts a network in which different computer systems provide data to a manager. Example computer systems may include application servers 106 and 110 or any other type of computer system having a processor for executing code to achieve a desired functionality. The application servers can run different applications, or separate instances of the same application. The application servers can be located remotely from one another or co-located. The application servers 106 and 110 communicate with a local manager computer 120, in this example. The manager computer 120 could alternatively be remote from the application servers 106 and 110, in which case communication between them may occur via a network cloud 104.

For example, a corporation running an enterprise application such as a web-based e-commerce application may employ a number of application servers at one location for load balancing. Requests from users, such as from an example web browser 102 of a user, are received via the network cloud 104 such as the Internet, and can be routed to any of the application servers 106 and 110. The web browser 102 typically accesses the network cloud 104 via an Internet Service Provider, not shown. Agent software running on the application servers 106 and 110, denoted by Agent A1 (108) and Agent A2 (112), respectively, gather information from an application, middleware or other software, running on the respective application servers 106 and 110, in one possible approach. For example, such information may be obtained using instrumentation, one example of which is byte code instrumentation. However, the gathered data may be obtained in other ways as well. The agents essentially live in the computer system being monitored and provide a data acquisition point. The agents organize and optimize the data communicated to the manager 120.

Various approaches are known for instrumenting software to monitor its execution. For example, as mentioned at the outset, tracing may be used to track the execution of software. One example of tracing is discussed in U.S. Patent Application Publication No. 2004/0078691, titled "Transaction Tracer", published Apr. 22, 2004, incorporated herein by reference. In one approach discussed therein, object code or byte code of an application to be monitored is instrumented, e.g., modified, with probes. The probes measure specific pieces of information about the application without changing the application's business or other logic. Once the probes have been installed in the byte code of an application, it is referred to as a managed application. The agent software receives information such as performance data from the probes and may communicate the information to another process, such as at the manager 120, or process the information locally, such as to determine whether the information indicates an abnormal condition. For example, the information from the probes may indicate performance data such as start and stop times of a transaction or other execution flow, or of individual components within a transaction/execution flow. This information can be compared to pre-established criteria to determine if it within bounds. If the information is not within bounds, the agent can report this fact to the manager so that appropriate troubleshooting can be performed. The agents 108, 112 and 116 are typically aware of the software executing on the local application servers 106 and 110, respectively, with which they are associated.

The manager 120 can be provided on a separate computer system such as a workstation which communicates with a user interface 122, such as a monitor, to display information based on data received from the agents. See example displays in FIGS. 4B-E and 5B-D. The manager can also access a database 118 to store the data received from the agents. In the example provided, the application servers can communicate with the manager 120 without accessing the network cloud 104. For example, the communication may occur via a local area network. In other designs, the manager 120 can receive data from the agents of a number of application servers via the network cloud 104. For instance, some large organizations employ a central network operations center where one or more managers obtain data from a number of distributed agents at different geographic locations. To illustrate, a web-based e-commerce enterprise might obtain agent data from servers at different geographic locations that receive customer orders, from servers that process payments, from servers at warehouses for tracking inventory and conveying orders, and so forth. The manager 120 and user interface display 122 might be provided at a corporate headquarters location. Other applications which are not necessarily web-based or involve retail or other sales, can similarly employ agents and managers for managing their systems. For example, a bank may use an application for processing checks and credit accounts. Moreover, in addition to the multi-computer system arrangements mentioned, a single computer system can be monitored as well with one or more agents.

Figure 2:
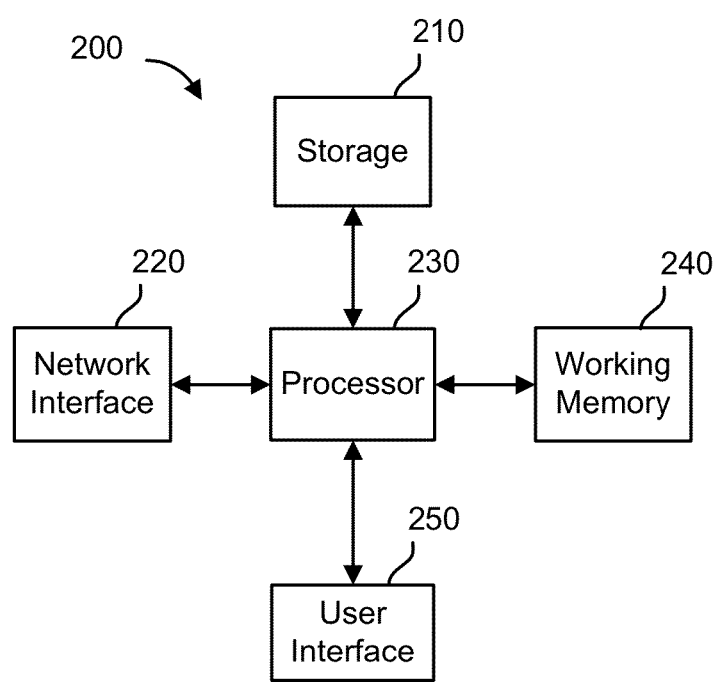
FIG. 2 depicts a computer system of the network of FIG. 1.

FIG. 2 depicts a computer system of the network of FIG. 1. The computer system 200 is a simplified representation of a system which might be used as the web browser 102, host (such as application servers 106 and 110), central manager 120 and/or user interface 122, such as discussed in connection with FIG. 1. The computer system 200 includes a storage device 210 such as a hard disk or portable media, a network interface 220 for communicating with other computer systems, a processor 230 for executing software instructions, a working memory 240 such as RAM for storing the software instructions after they are loaded from the storage device 210, for instance, and a user interface display 250. The storage device 210 may be considered to be a processor readable storage device having processor readable code embodied thereon for programming the processor 230 to perform methods for providing the functionality discussed herein. The user interface display 250 can provide information to a human operator based on the data received from one or more agents. The user interface display 250 can use any known display scheme, whether graphical, tabular or the like. In addition to an on-screen display, an output such as a hard copy such from a printer can be provided.

Further, the functionality described herein may be implemented using hardware, software or a combination of both hardware and software. For software, one or more tangible processor readable storage devices having processor readable code embodied thereon for programming one or more processors may be used. The tangible processor readable storage devices can include computer readable media such as volatile and nonvolatile media, removable and non-removable media. For example, tangible computer readable media may include volatile and nonvolatile, removable and non-removable media implemented in any method or technology for storage of information such as computer readable instructions, data structures, program modules or other data. Examples of tangible computer readable media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. In alternative embodiments, some or all of the software can be replaced by dedicated hardware including custom integrated circuits, gate arrays, FPGAs, PLDs, and special purpose processors. In one embodiment, software (stored on a storage device) implementing one or more embodiments is used to program one or more processors. The one or more processors can be in communication with one or more tangible computer readable medial storage devices, peripherals and/or communication interfaces.

Figure 3A:
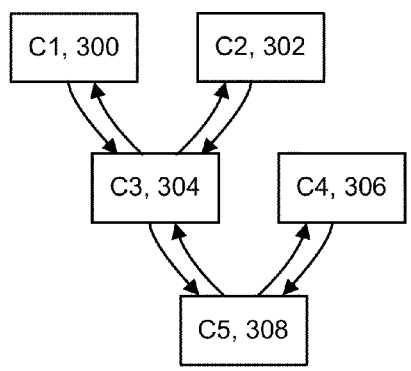
FIG. 3A depicts an example of potential calling sequences of instrumented components.

FIG. 3A depicts an example of potential calling sequences of instrumented components. Components are depicted in an application which may run on an application server such as application server 106 or 110 of FIG. 1. Note that, when an application is instrumented, typically only selected components are instrumented based on the developer's understanding of the application and selection of components which are expected to be of interest. Thus, many components which are not deemed to be of interest, at least initially, may be invoked/called in an application, but are not instrumented.

Component oriented programming models are useful in allowing the programmer to assemble an application or other program from building blocks referred to as components. Each component can perform a specific function which fits in with an overall functionality of the software. Furthermore, a component can call other components, as well as calling itself, in a recursive call, so that a sequence of components is invoked in a program. The components are examples of resources in a computer system that are consumed, or work that is done, when a program executes. One example of a component oriented programming model is J2EE, which can employ components such as a Java Server Page, an Enterprise Java Bean, a servlet, and a Java Database Connectivity component. However, other component oriented programming models may also be used, such as those using Microsoft .NET components. Moreover, the programming model need not be object oriented. In one approach, the components are methods.

In the specific example shown, component C1 300 and C2 302 can call a component C3 304. The arrows indicate method calls, at a start of execution, and method returns, at the end of execution. Components C3 304 and C4 306 can call a component C5 308. Thus, the possible calling sequences include: C1-C3-C5, C2-C3-C5 and C4-C5. Each of the components depicted is assumed to be instrumented so that performance data including execution times can be obtained from them. However, there may be additional components which are called which are not currently instrumented. To avoid slowing down the application excessively, not all components can be instrumented. Moreover, even if the additional components could be instrumented temporarily to diagnose a performance problem with the application, the amount of data provided by the instrumentation could still be over-inclusive. For optimal efficiency, conditional instrumentation can be provided which is conditional to a context in which a components executes. The context can be set so that it corresponds to a context in which a performance problem occurs or, generally, to a specific context which is desired to be analyzed.

Figure 3B:
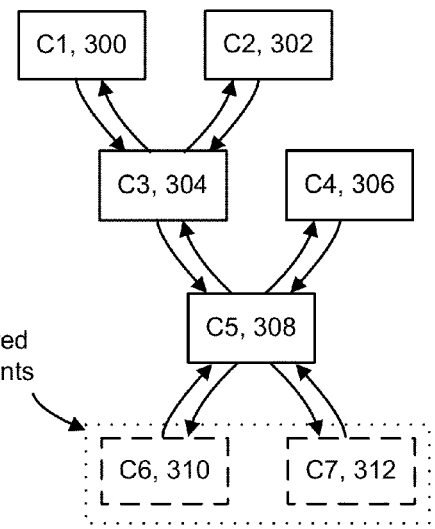
FIG. 3B depicts an example of discovered components which are callable by the instrumented components of FIG. 3A.

For example, assume that C5 is identified as having a performance problem, such as an excessive execution time. In this case, a process can be implemented to discover un-instrumented methods which could be called by C5, e.g., callable methods of C5. An un-instrumented method could have instrumentation code which is inactivated, or no instrumentation code present. In the example of FIG. 3B, the discovered components are C6 310 and C7 312.

FIG. 3B depicts an example of discovered components which are callable by the instrumented components of FIG. 3A. The discovered components can be instrumented to obtain performance data which can help analyze the performance problem with C5. For example, it may be determined that C6 takes too long to execute when it is called by C5, but C7 has acceptable performance when it is called by C5. This indicates that additional analysis involving C6 is may be warranted.

Regarding context, the instrumentation of C6 and C7 may be conditioned upon one component, or a specified sequence of multiple components, being called. For instance, it may be determined that C5 has performance problems when it is called in the sequence C1-C3-C5, but C5 does not have performance problems when it is called in another sequence, such as C2-C3-C5, or C4-C5. Thus, the instrumentation of C6 and C7 may be conditioned upon C6 or C7 being called by the sequence C1-C3-C5. If C6 or C7 are called by this sequence, so that the specified context is met, the conditional instrumentation of C6 or C7 executes to report the execution or calling of C6 or C7, such as to an agent. Likewise, if C6 or C7 are called by another sequence, so that the specified context is not met, the instrumentation of C6 or C7 does not execute to report the execution or calling of C6 or C7.

Note that more than one context can be implemented as well for a given callable component. For example, C6 may be instrumented based on the contexts of C1-C3-C5 and C2-C3-C5.

Figure 3C:
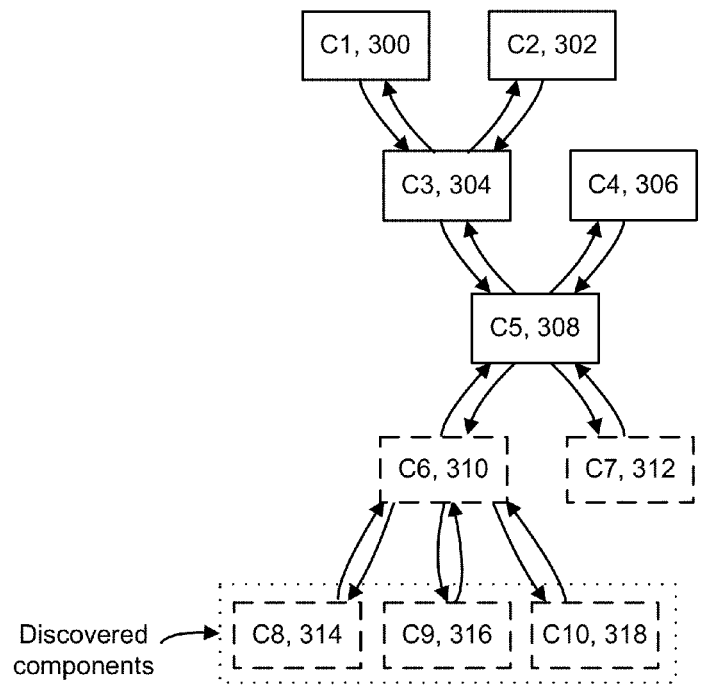
FIG. 3C depicts an example of discovered components which are callable by one of the discovered components of FIG. 3B.

Once a callable component is discovered, the process can be repeated to discover and instrument additional levels of callable components which are further down in a hierarchy of components. For example, FIG. 3C depicts an example of discovered components which are callable by one of the discovered components of FIG. 3B. Specifically, components C8 314, C9 316 and C10 318 are callable from C6. These discovered components can be instrumented to obtain performance data which can help analyze the performance problem with C6. Note that this example proceeded with discovery and instrumentation one level of components at a time, where the level refers to a level of the components in a hierarchy. For instance, in the hierarchy of FIG. 3C, the first level includes C1 and C2, the second level includes C3 and C4, the third level includes C5, the fourth level includes C6 and C7 and the fifth level includes C8, C9 and C10. There may or may not be additional lower levels in the hierarchy. Another approach is to perform discovery and instrumentation with more than one level of components at a time. For instance, C6 and C7 could be discovered, after which C8, C9 and C10 are discovered, in addition to discovering callable components of C7, not depicted. The components C6-C10 and the callable components of C7 can then be instrumented together.

Regarding context, the instrumentation of C8, C9 and C10 may be conditioned upon a specified sequence of components being called. For instance, it may be determined that C6 has a performance problem when it is called in the sequence C1-C3-C5-C6, but not when it is called in another sequence. Thus, the instrumentation of C8, C9 and C10 may be conditioned upon C8, C9 or C10 being called by the sequence C1-C3-C5-C6. If C8, C9 or C10 are called by this sequence, so that the specified context is met, the instrumentation of C8, C9 or CIO executes to report the execution/calling of C8, C9 or C10. Likewise, if C8, C9 or C10 are called by another sequence, so that the specified context is not met, the instrumentation of C8, C9 or C10 does not execute to report the execution/calling of C8, C9 or C10.

Figure 3D:
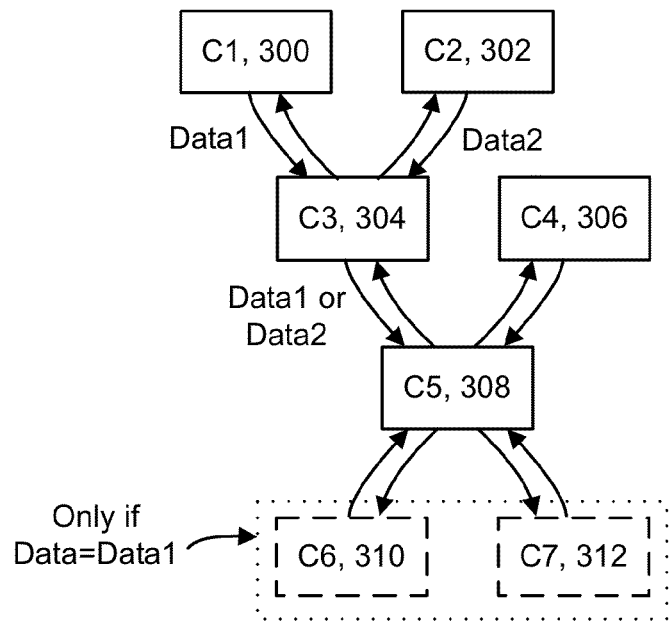
FIG. 3D depicts the discovered components of FIG. 3B in which components are called in a context of transaction data.

FIG. 3D depicts the discovered components of FIG. 3B in which components are called in a context of transaction data. Another aspect of a calling context can involve data of a transaction in which a component executes. While conditioning instrumentation of discovered components on a calling sequence is helpful in narrowing down the amount of performance data to analyze, efficiencies can be obtained, additionally or alternatively, by setting a transaction data-based context. For example, consider a web-based e-commerce application which allows users to order and pay for items. Transaction data may indicate that a performance problem results when a particular payment type is used.

In FIG. 3D, Data1 and Data2 represents possible types of transaction data. For example, assume Data1 represents a problematic payment type and Data2 represents a non-problematic payment type. Generally, different aspects of a transaction can be represented by respective data fields. When C1 calls C3, it includes Data1, such as in a header of a message, so that C3 can access this data if desired. In this sequence, Data1 is passed from C3 to C5, and from C5 to C6 or C7. On the other hand, in a sequence in which C2 calls C3, Data2 (different than Data1) is passed from C2 to C3, from C3 to C5 and from C5 to C6 or C7. In this example, the conditional instrumentation of C6 or C7 executes to report performance data only if Data1 is passed to C6.

Figure 4A:
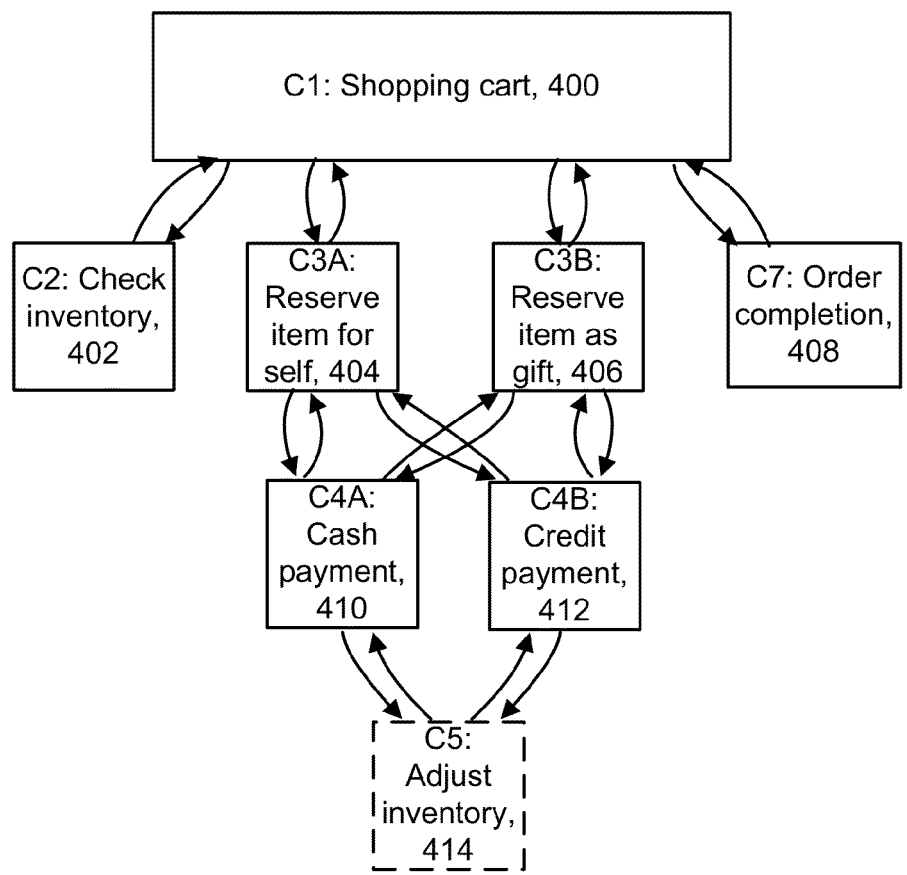
FIG. 4A depicts an example of a transaction of buying a product on an e-commerce web site, including calling sequences of instrumented components and a discovered component.

FIG. 4A depicts an example of a transaction of buying a product on an e-commerce web site, including calling sequences of instrumented components and a discovered component. This is one example of a transaction involving a user. The component identifiers used herein do not necessarily correspond to the previous examples of FIGS. 3A-3D. However, the component identifiers of FIGS. 4A-E and 5A-5D and 8J are used consistently. Consider a web-based e-commerce application which allows users to order items. The components correspond to business logic or e-commerce steps in the application. In particular, a component C1 400 provides a shopping cart which allows a user to select an item to purchase and to enter information such as the payment method, e.g., type of credit card and credit card number, and the shipping information, e.g., the address to which the item is to be shipped and the method of shipping, e.g., ground delivery or overnight air delivery. C1 calls a component C2 402 to check an inventory to determine if the selected item is in stock. Once it is determined that the selected item is in stock, C2 completes execution, and the control flow returns to C1. C1 calls a component C3A 404 or C3B 406, which reserves the item so that it will not be sold to another user while the transaction is still pending. In the case of C3A, the item is reserved for the user himself or herself, while in the case of C3B, the item is reserved by the user as a gift for another person, such as in a gift registry or wish list. C3A or C3B call a debit payment component C4A 410, which processes a cash payment, e.g., as debit card or bank account transfer, or payment by a third-party payer such as PAYPAL®, or a credit payment component C4B 412, which processes a credit payment, e.g., payment by a particular credit card issuer, or payment by a gift certificate or coupon. The components C4A and C4B may communicate with an external server to authorize and validate the purchase.

In this example, C4A or C4B call a component C5 414 which adjusts an inventory by decrementing the quantity of the item which is purchased. However, C5 initially does not include instrumentation and is discovered as a callable method of C4A or C4B. For instance, if performance data indicates that C4A takes too long to execute, while the performance of C4B is acceptable, C5 may be discovered as a callable method of C4A, and conditional instrumentation applied to C5. This allows performance data of C5 to be obtained in an attempt to diagnose C4A. C5 could also be discovered based on both C4A and C4B having a performance problem.

Once C5 and any components which are called under C5, not depicted, complete executing, the execution flow returns to C1, so that execution of C4A or C4B is completed, after which execution of C3A or C3B is completed. C1 then calls an order completion component C7 408 to confirm the purchase to the user such as by providing an order confirmation number and a tracking number, e.g., in a confirmation e-mail or web page.

Note that a component can continue executing after calling another component, which begins executing, in an asynchronous, multi-thread or multi-process mode, or can temporarily pause until the called component has finished executing, in a synchronous, single-thread or single-process mode. For example, C3A or C3B can pause while the components C4A or C4B and C5 execute. Moreover, a given component may be invoked more than once during a transaction.

Figure 4B:
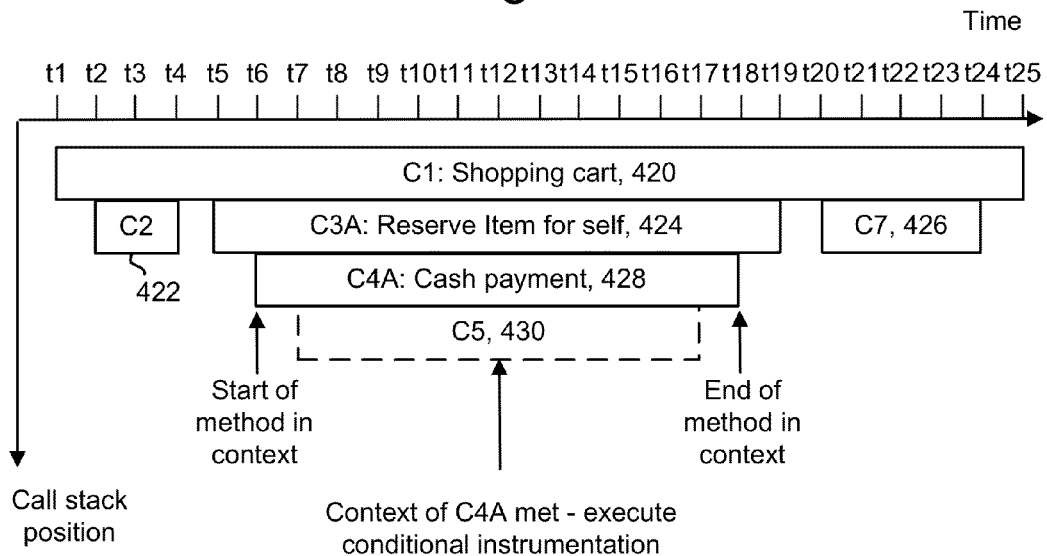
FIG. 4B depicts a call stack position vs. time graph based on the calling sequence of FIG. 4A, where conditional instrumentation is applied to the discovered component, and a condition of the conditional instrumentation is met by one component in the calling sequence.

FIG. 4B depicts a call stack position vs. time graph based on the calling sequence of FIG. 4A, where conditional instrumentation is applied to the discovered component, and a condition of the conditional instrumentation is met by one component in the calling sequence. The time increments are not necessarily evenly spaced. However, the time increments in the graphs of 4B-4E and 5B and 5C are consistent The representation, a transaction trace, is an example of the type of execution path information provided by one or more hosts. It can be a graphical representation which is provided as a report on a user interface, for instance, and represents performance data in the form of execution times of components such as methods. The execution path information can identify which methods of an application are invoked and the time in which they are invoked. The horizontal direction represents time, while the vertical direction indicates call stack depth or position. A call stack identifies methods which have been called or invoked during the execution of one or more programs or threads. An execution path will typically extend for a fraction of a second to a few seconds.

An example execution path depicts components and respective graph regions and execution times as follows: C1 420 (t1-t25), C2 422 (t2-t4), C3A 424 (t5-t19), C4A 428 (t6-t18), C5 430 (t7-t17) and C7 426 (t20-t24). This example includes the option of reserving the item for one's self (C3A) and making a cash payment (C4A). A host receives a request from a client and notes when C1 begins executing at t1. Each transition in the sequence is noted by the agent based on instrumentation. C1 calls C2 at t2, and C2 completes executing at t4. C1 calls C3A at t5. C3A calls C4A at t6. C4A calls C5 at t7. C5 completes executing at t17. C4A completes executing at t18. C3A completes executing at t19. C1 calls C7 at t20, and C7 completes executing at t24. The host provides a response to the client, at which time C1 completes executing, at t25. The host periodically reports time and transaction data to the central manager.

The region 430 for C5 is shown in dashed lines to indicate that C5 is conditionally instrumented. Further, in this example, the context or condition which is required to activate the instrumentation is that C5 is called by C4A. That is, the context can be based on a set of one or more specific called methods within a stack. As depicted, the start and end of the method in the context are at t6 and t18, respectively. Since C4A is executing when C5 is called, the context is met, and the conditional instrumentation of C5 executes.

Initially, assume that C5 is not conditionally instrumented, so that the graph of FIG. 4B does not include the region C5. The graph may indicate to the user, or the corresponding data behind the graph can be automatically processed to determine, that the response time of C4A is too long and exceeds a threshold level. However, at this time, no information is known from the user interface regarding any methods which might be called by C4A. In this example, the techniques described herein are used to discover that C5 is callable from C4A. A callable component may be, but is not necessarily, called by another component. A particular method which is called directly by another method which is one level higher in the graph may be considered to be a child method of the another method. Similarly, the next higher method in the graph may be a grandparent method of the particular method, and so forth. Once a callable method is identified, it can be instrumented to obtain performance data from it when it is subsequently called. In this case, C5 is instrumented after it is discovered, and the application continues to execute so that new performance data is gathered and the region 430 can be displayed in the graph.

Figure 4C:
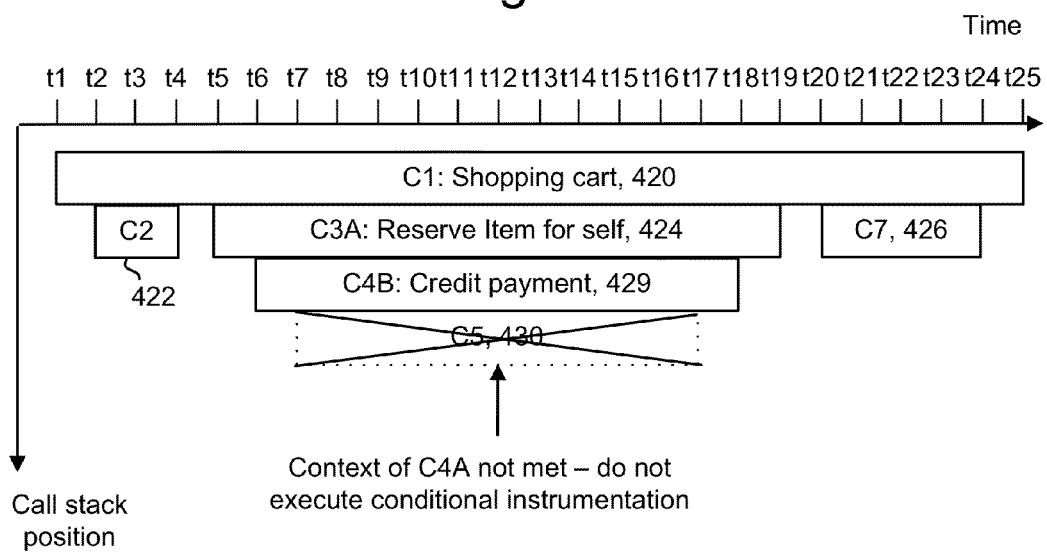
FIG. 4C depicts a call stack position vs. time graph based on the calling sequence of FIG. 4A, where conditional instrumentation is applied to the discovered component, and a condition of the conditional instrumentation is not met by the calling sequence.

FIG. 4C depicts a call stack position vs. time graph based on the calling sequence of FIG. 4A, where conditional instrumentation is applied to the discovered component, and a condition of the conditional instrumentation is not met by the calling sequence. As with FIG. 4B, the context which is required to activate the instrumentation is that C5 is called by C4A. However, in this case, C4B is executed instead of C4A, as depicted by graph region 429. As a result, the context of C4A is not met, and the conditional instrumentation does not execute, so that the region 430 does not appear in the graph.

Figure 4D:
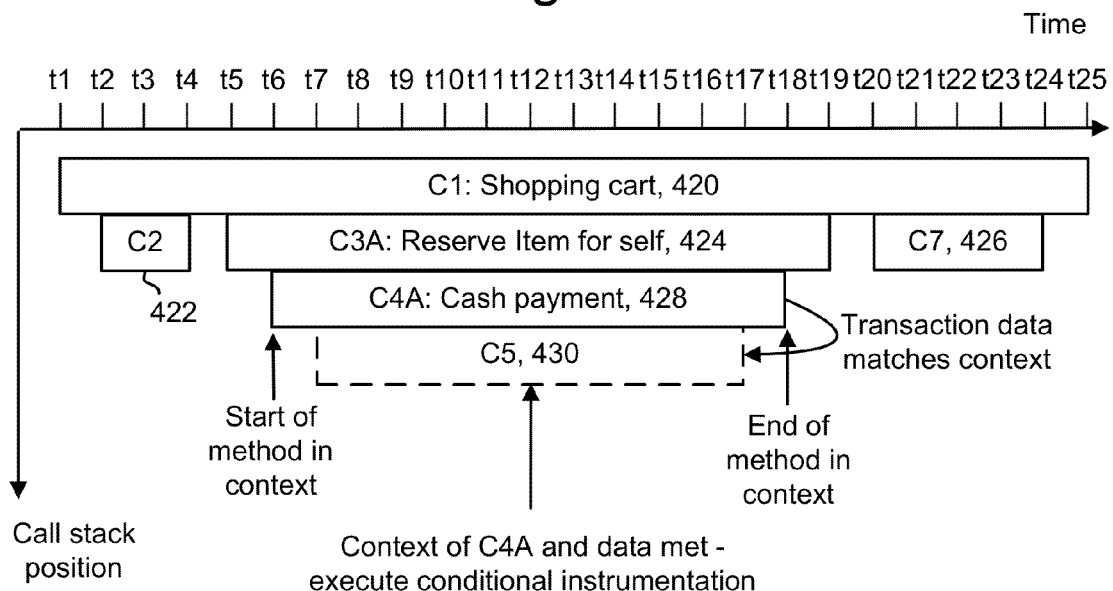
FIG. 4D depicts a call stack position vs. time graph based on the calling sequence of FIG. 4A, where conditional instrumentation is applied to the discovered component, and a condition of the conditional instrumentation is met by a combination of one component in the calling sequence and by transaction data.

FIG. 4D depicts a call stack position vs. time graph based on the calling sequence of FIG. 4A, where conditional instrumentation is applied to the discovered component, and a condition of the conditional instrumentation is met by a combination of one component in the calling sequence and by transaction data. As mentioned, a context or condition of conditional instrumentation can include one or more specified methods being called and/or specified transaction data being present. Specifically, a data object or element which is carried by a transaction can be examined. For example, the presence of a specific value in a header of inter-component messages can be used as a context. Or, the mere presence of a data field with a value which is not null, or which is null, may be used as a context.

The transaction data can include various items, including: type of product ordered, identity of product vendor, class of user making a purchase (such as a "premium" user who holds a membership which entitles the user to special privileges vs. a "regular" user who does not have such privileges), whether the e-commerce application is accessed via a specified portal, geographic location of the user, payment mode, product shipping mode, and so forth. In these cases, instrumentation can be conditioned upon a context in which transaction data indicates, e.g., that a problematic product type and/or vendor is involved. Instrumentation can thus be conditioned upon a context which involves one or more aspects of a transaction in which a user participates, or generally, any type of transaction. Moreover, the concepts herein are not limited to web-based e-commerce applications but can include other web-based applications and non-web-based applications.

This example is the same as FIG. 4B except for the addition of transaction data passed from C4A to C5 matching a context. As a result, the two aspects of the context are met, where the first aspect is that C4A is executing when C5 is called, e.g., C5 is called by C4A, and the second aspect is that specified data is passed to C5 by C4A. The data is a data object of a transaction in which C4A and C5 are called. Since the context is met, the conditional instrumentation of C5 executes.

Figure 4E:
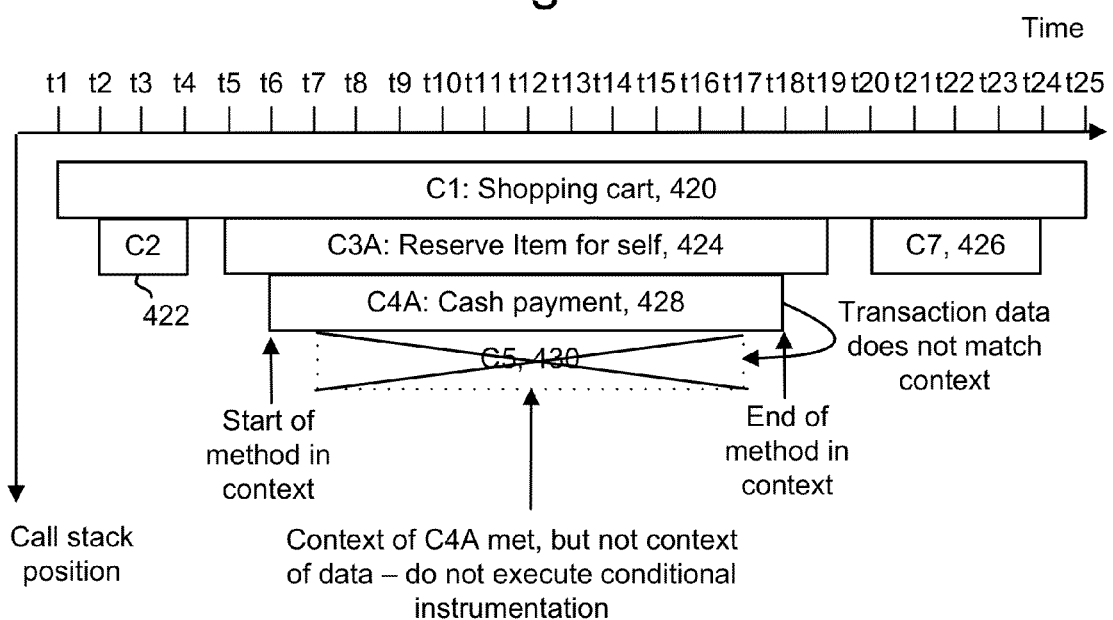
FIG. 4E depicts a call stack position vs. time graph based on the calling sequence of FIG. 4A, where conditional instrumentation is applied to the discovered component, and a condition of the conditional instrumentation is met by one component in the calling sequence, but is not met by transaction data.

FIG. 4E depicts a call stack position vs. time graph based on the calling sequence of FIG. 4A, where conditional instrumentation is applied to the discovered component, and a condition of the conditional instrumentation is met by one component in the calling sequence, but is not met by transaction data. In this example, the context of C5 being called by C4A is met, but the transaction data does not match the context. As a result, the context is not met, and the conditional instrumentation does not execute, so that the region 430 does not appear in the graph.

Figure 5A:
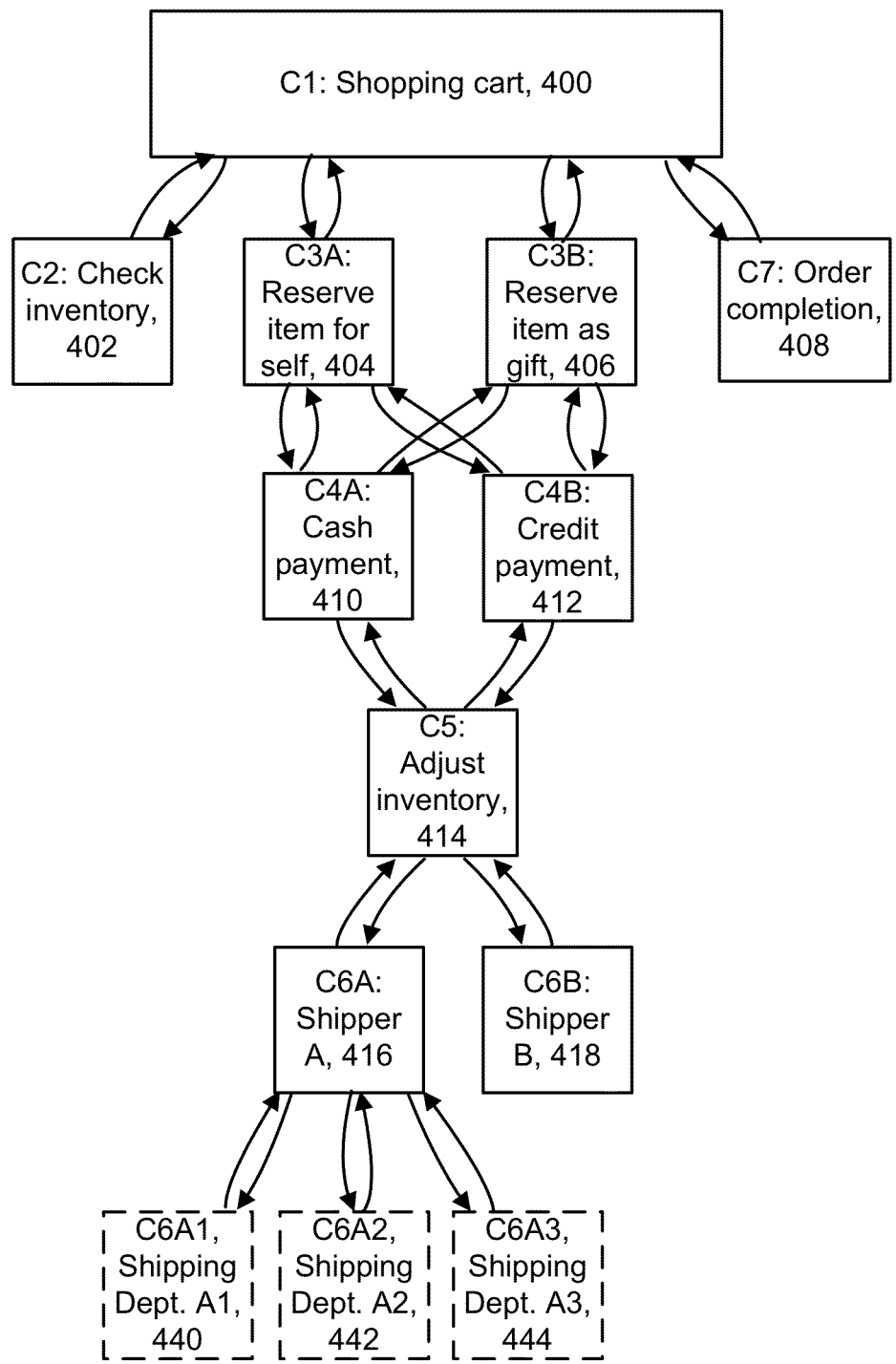
FIG. 5A depicts another example of a transaction of buying a product on an e-commerce web site, including calling sequences of instrumented components and discovered components.

FIG. 5A depicts another example of a transaction of buying a product on an e-commerce web site, including calling sequences of instrumented components and discovered components. The example is analogous to the example of FIG. 4A, and adds components C6A 416 and C6B 418, which are callable components of C5 414, and components C6A1 440, C6A2 442 and C6A3 444 which are discovered to be callable components of C6A. C6A and C6B represent methods for shipping a product via a shipper A or a shipper B, respectively. C6A1, C6A2 and C6A3 represent shipping a product via a shipping dept. A1, A2 or A3, respectively, of the shipper A. This example shows that conditional instrumentation is provided for C6A1, C6A2 and C6A3, and static instrumentation is provided for C5, C6A, C6B.

Figure 5B:
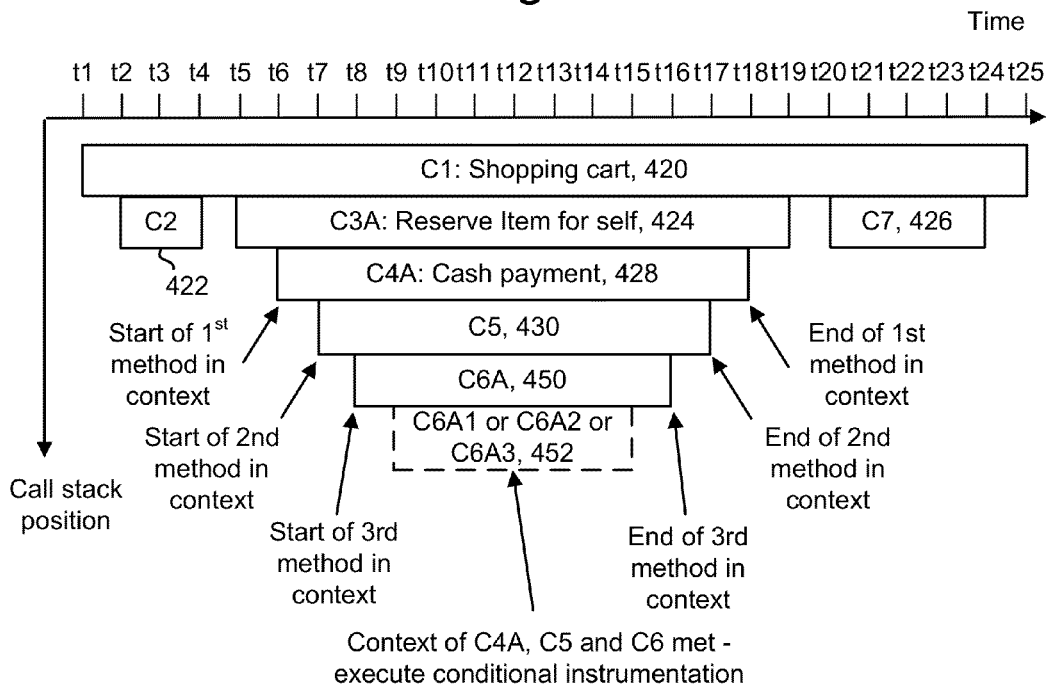
FIG. 5B depicts a call stack position vs. time graph based on the calling sequence of FIG. 5A, where conditional instrumentation is applied to the discovered components, and a condition of the conditional instrumentation is met by three components in the calling sequence.

FIG. 5B depicts a call stack position vs. time graph based on the calling sequence of FIG. 5A, where conditional instrumentation is applied to the discovered components, and a condition of the conditional instrumentation is met by three components in the calling sequence. The graph is analogous to that of FIG. 4B except the region 430 for C5 is shown with a solid line since it is statically instrumented in this example. Additionally, a region 450 represents C6A being called by C5, and a dashed line region 452 represents C6A1, C6A2 or C6A3 being callable from C6A.

C1 calls C2 at t2, and C2 completes executing at t4. C1 calls C3A at t5. C3A calls C4A at t6. C4A calls C5 at t7. C5 calls C6A at t8. C6A calls C6A1, C6A2 or C6A3 at t9, and C6A1, C6A2 or C6A3 completes executing at t15. C6A completes executing at t16. C5 completes executing at t17. C4A completes executing at t18. C3A completes executing at t19. C1 calls C7 at t20, and C7 completes executing at t24. The host provides a response to the client, at which time C1 completes executing, at t25.

The context for the conditional instrumentation of C6A1, C6A2 or C6A3 requires the sequence of C4A-C5-C6A precede C6A1, C6A2 or C6A3 being called. The context may also require that the components with conditional instrumentation, i.e., C6A1, C6A2 or C6A3, are called by the last component in the sequence, i.e., C6A. In this example, the condition is met so that the conditional instrumentation is executed. Specifically, C4A, the first method in the context starts executing at t6. C5, the second method in the context starts executing at t7. C6A, the third method in the context starts executing at t8. Thus, each of the components in the sequence is executing when C6A1, C6A2 or C6A3 is called. Subsequently, the third, second and first methods of the context stop executing at t16, t17 and t18, respectively.

Figure 5C:
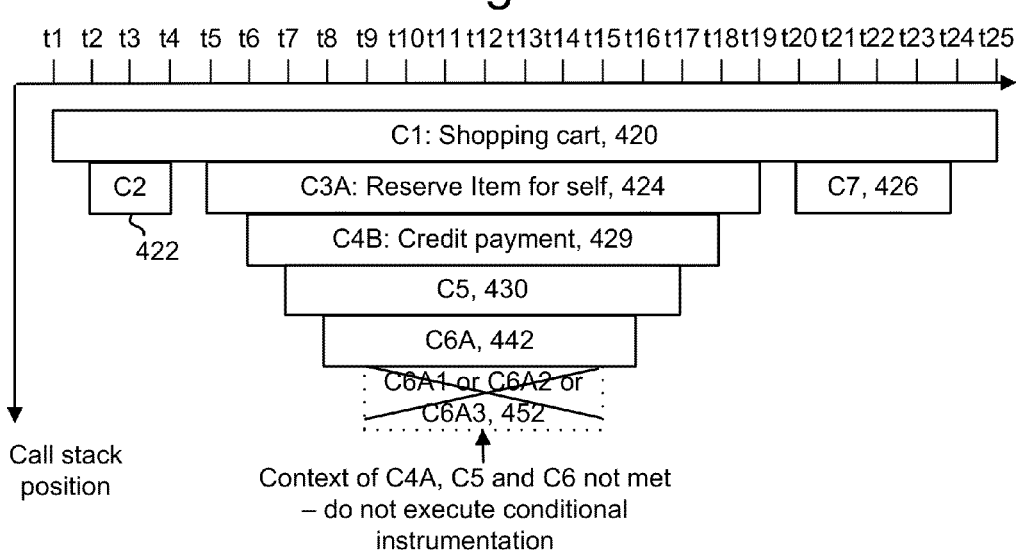
FIG. 5C depicts a call stack position vs. time graph based on the calling sequence of FIG. 5A, where conditional instrumentation is applied to the discovered component, and a condition of the conditional instrumentation is not met by the calling sequence.

FIG. 5C depicts a call stack position vs. time graph based on the calling sequence of FIG. 5A, where conditional instrumentation is applied to the discovered components, and a condition of the conditional instrumentation is not met by the calling sequence. Here, C4B, represented by region 429, is called in place of C4A, so that the context which requires the sequence of C4A-C5-C6A is not met, and the conditional instrumentation of C6A1, C6A2 or C6A3 does not execute.

Figure 5D:
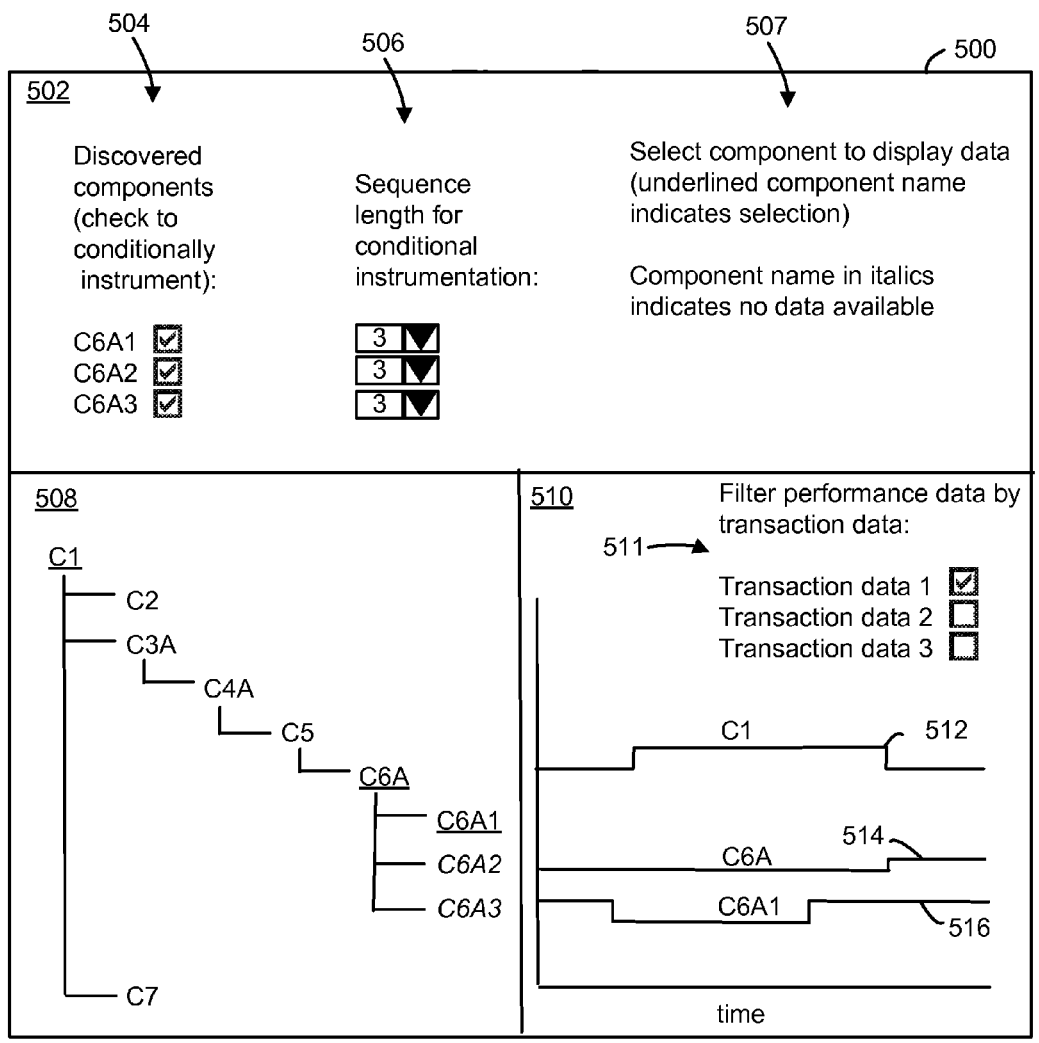
FIG. 5D depicts a user interface display which indicates a hierarchical relationship among components and corresponding performance data, and by which a user can manually identify a component to be conditionally instrumented, or to remove conditional instrumentation, to specify a sequence length of conditional instrumentation, and to filter performance data based on transaction data.

FIG. 5D depicts a user interface display which indicates a hierarchical relationship among components and corresponding performance data, and by which a user can manually identify a component to be conditionally instrumented, or to remove conditional instrumentation, to specify a sequence length of conditional instrumentation, and to filter performance data based on transaction data. The user interface display 500 is consistent with the examples of FIGS. 5A and B. A portion 504 of a region 502 identifies the names of one or more discovered components, e.g., C6A1, C6A2 and C6A3. The names of other components can also be provided. A checkbox next to the component name/identifier can be checked by a user to cause conditional instrumentation to be applied for the component. The user may indicate that instrumentation should be added to certain discovered components based on, e.g., observations of which components are involved in errors or have themselves generated an error, prior troubleshooting experience and other factors. Or, instrumentation can be automatically applied to discovered components.

When conditional instrumentation is applied to a component, the checkbox can subsequently be unchecked by the user to remove the instrumentation. A portion 506 of the region 502 allows the user to set a sequence length in a context for conditional instrumentation using a drop down widget. This can represent, e.g., a number of successive components which are called before the discovered component. In one approach, the last component of the sequence calls the discovered component. In this example, the length is three for each discovered component, corresponding to the sequence C4A-C5-C6A. It is possible to provide a different sequence length for different components. The sequence length can be preset to a default level as well. Generally, the amount of performance data which is provided can be reduced by increasing the sequence length.

A portion 507 of the display region 502 informs the user that the user can select one or more components in a display region 508 to display data, e.g., a trace, for that component based on its instrumentation in a display region 510, and that component names in italics in region 508 indicate that no data is available.

The display region 508 can be automatically populated with each of the components in the application using a hierarchical structure such as a tree which shows which components are under, or called by, another component. In this example, C6A1 is called by C6A since the context of the conditional instrumentation of C6A1 is met. As a result, the performance data 516 for C6A1 is available when the name "C6A1" is clicked on, using a mouse or other pointing device, in tree in the region 508. In contrast, the other two discovered components of C6A, namely C6A2 and C6A3, are not called by C6A. The names "C6A2" and "C6A3" are displayed in italics in the tree to indicate that no performance data is currently available. Thus, C6A2 and C6A3 cannot be selected by the user, such as by clicking with a mouse, to view corresponding performance data in the region 510.

The display region 510 depicts performance data such as transaction traces of the instrumented components based on the instrumentation, for selected ones of the components in the region 508. For example, components C1, C6A and C6A1 are currently selected by a user, as indicated by the underlining of the component names in the region 508, and corresponding performance data such as transaction traces is provided by curves 512, 514 and 516 in region 510. The region 510 can be populated with performance data provided from the agent to the central manager.

When applicable, a portion 511 of the region 510 allows the user to filter the performance data by transaction data, such as by checking or unchecking boxes to include or not include, respectively, certain transaction data. For instance, Transaction data 1 is currently checked, so the curves 512, 514 and 516 are provided only for invocations of C1, C6A and C6A1, respectively, which occur under Transaction data 1. As an example, the transaction data may be associated with different user classes. Transaction data 1 may indicate a transaction involving a "premium" user, Transaction data 2 may indicate a transaction involving a "mid-level" user (between premium and regular), and Transaction data 3 may represent a "regular" user.

Figure 6:
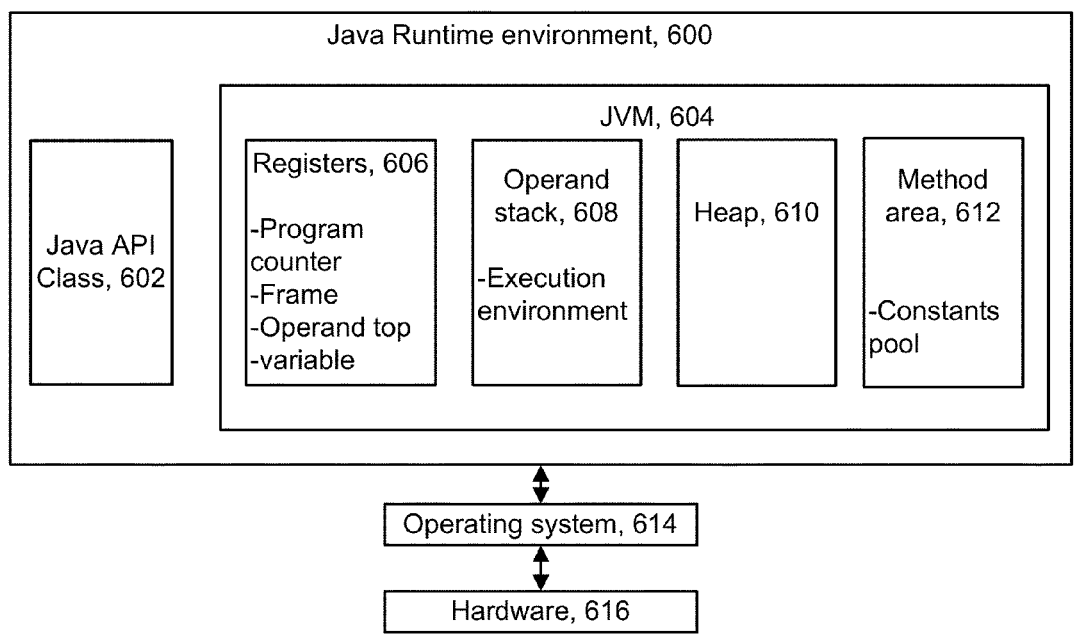
FIG. 6 depicts a JAVA runtime environment.

FIG. 6 depicts a JAVA runtime environment. The JAVA runtime environment 600 is built on an operating system, 614, which is built on hardware 616. The JAVA runtime environment includes a number of virtual parts, including the JAVA API Class 602 and a JVM 604. The JVM includes registers 606, an operand stack 608, a heap 610 and a method area 612. The JVM processes a stream of byte codes as a sequence of instructions. A JVM instruction consists of an opcode specifying the operation to be performed, followed by zero or more operands embodying values to be operated upon. The operand stack, heap and method area are within addressable memory. The size of an address is 32 bits, each memory location contains one byte, and each register stores one 32-bit address. The method area contains byte codes and is aligned on byte boundaries, while the operand stack and the heap are aligned on word (32-bit) boundaries.

The registers includes a program counter (pc), which keeps track of where in the memory it should be executing instructions. The program counter identifies the next byte code to be executed. The frame register contains a pointer to the execution environment of the current method in the operand stack. The operand top (optop) register contains a pointer to the top of the operand stack, and is used to evaluate arithmetic expressions. The variable (vars) register contains a pointer to local variables.

The operand stack supplies parameters to methods and operations and receives results back from them. All byte code instructions take operands from the stack, operate on them, and return results to the stack. The operand stack includes a stack frame of an executing method. The stack frame holds the state, e.g., local variables, and intermediate results of calculations, for a particular invocation of a method. Specifically, each JVM thread has a private JVM stack, created at the same time as the thread. A JVM stack stores frames, holds local variables and partial results, and plays a part in method invocation and return. A frame is thus used to store data and partial results, as well as to perform dynamic linking, return values for methods, and dispatch exceptions. A new frame is created each time a method is invoked. A frame is destroyed when its method invocation completes, whether that completion is normal or abrupt (it throws an uncaught exception). Frames are allocated from the JVM stack of the thread creating the frame. Each frame has its own array of local variables, its own operand stack, and a reference to the runtime constant pool of the class of the current method.

The heap or memory allocation pool is garbage collected. The heap is the runtime data area from which memory for all class instances and arrays is allocated. The heap is created on virtual machine start-up, and heap storage for objects is reclaimed by an automatic storage management system known as a garbage collector. Specifically, each program running in the Java runtime environment has a garbage-collected heap assigned to it. Moreover, each class in the heap has a constant pool associated with it. Because constants do not change, they are usually created at compile time. Items in the constant pool encode all the names used by any method in a particular class. The class contains a count of how many constants exist, and an offset that specifies where a particular listing of constants begins within the class description.

The method area stores byte code instructions that are associated with methods in the compiled code, and a symbol table which the execution environment needs for dynamic linking. Any debugging or additional information that might need to be associated with a method is stored in this area as well. The program counter always points to, e.g., contains the address of, some byte in the method area. The program counter is used to keep track of the thread of execution. After a byte code instruction has been executed, the program counter will contain the address of the next instruction to execute.

The method area is shared among all JVM threads, and stores per-class structures such as the runtime constant pool, field and method data, and the code for methods and constructors, including the special methods used in class and instance initialization and interface type initialization. The method area is created on virtual machine start-up. A runtime constant pool is a per-class or per-interface runtime representation of the constant_pool table in a class file. It contains several kinds of constants, ranging from numeric literals known at compile time, to method and field references that must be resolved at run time. Each runtime constant pool is allocated from the JVM's method area. The runtime constant pool for a class or interface is constructed when the class or interface is created by the JVM.

Figure 7A:
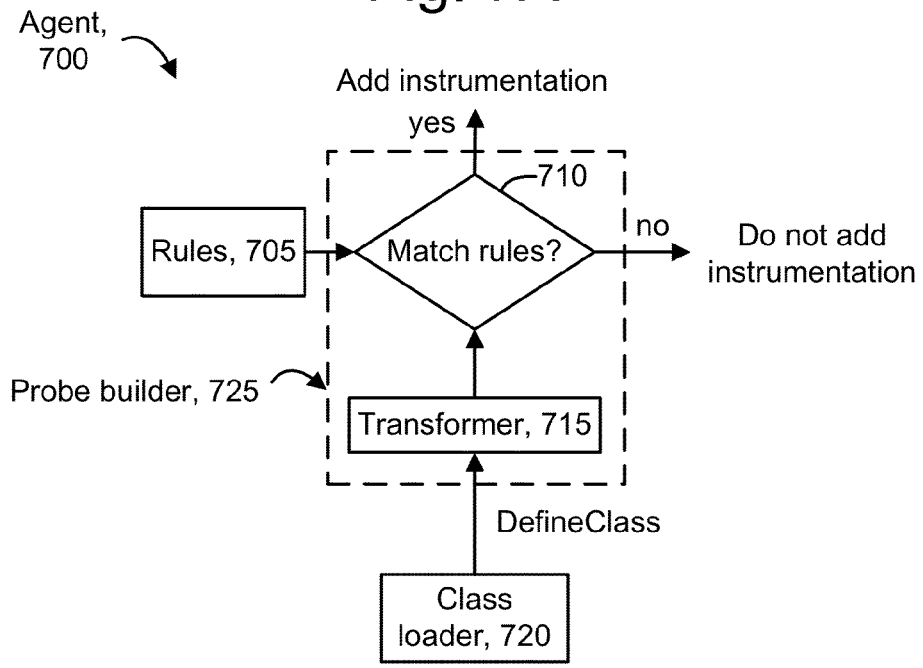
FIG. 7A depicts a JAVA-based example process flow for static instrumentation.

FIG. 7A depicts a JAVA-based example process flow for static instrumentation. The process may be implemented by an agent 700, such as the agent 108 or 112 of FIG. 1, in one possible approach. One approach to instrumentation involves providing static rules which determine which components, such as methods, are to be instrumented. The rules are accessed at the time the components are loaded into the application. In such an approach, a class loader 720 is used to provide raw data bytes of an application byte code to a transformer 715, which transforms the raw bytes into a class, for instance. For example, in JAVA, this may involve using the method defineClass of the ClassLoader object, which is responsible for loading classes. The class ClassLoader is an abstract class. Given the name of a class, a class loader should attempt to locate or generate data that constitutes a definition for the class. A typical strategy is to transform the name into a file name and then read a "class file" of that name from a file system. The method defineClass converts an array of bytes into an instance of class Class. Instances of the class Class represent classes and interfaces in a running JAVA application. The transformer 715 is thus software which can transform byte code to add instrumentation, such as by transforming classes. In one approach, the minimum unit of processing of the transformer 715 is a class file and its byte array.

If the application byte code matches rules (directives) 705 at a decision block 710, the transformer 715 adds probes in the form of tracer byte code. If the application byte code does not matches the rules 705 at the decision block 710, the transformer 715 does not add instrumentation to the byte code. The transformer 715 and the decision block 710 may be considered to be part of a probe builder 725.

In this implementation, the rules 705 are a set of typically static rules that identify portions of the managed application which are to be instrumented. The rules are usually implemented when a class is defined in a virtual machine for the first time. A class can be loaded multiple times while being defined only once. For example, there can be multiple class loaders loading the same class. Further, components such as classes may be instrumented based on whether they are named a certain way, whether they implement a certain interface, whether they extend a certain subclass or super class, and so forth. Such components are selected to be instrumented because it is believed they might provide performance data which is useful or otherwise interesting.

For instance, a rule may indicate that all servlets should be instrumented since it is believed that at least some of the servlets may provide interesting data. In this case, the rules 705 may indicate that all components that are subclasses of the JAVA class HttpServlet should be instrumented. HttpServlet is an abstract class from which all servlets depend. However, not all components can be instrumented, and there is a tension in that over-inclusive instrumentation results in excessive overhead costs and possibly impairing the operation of the application, while under-inclusive instrumentation results in the omission of important performance data.

Figure 7B:
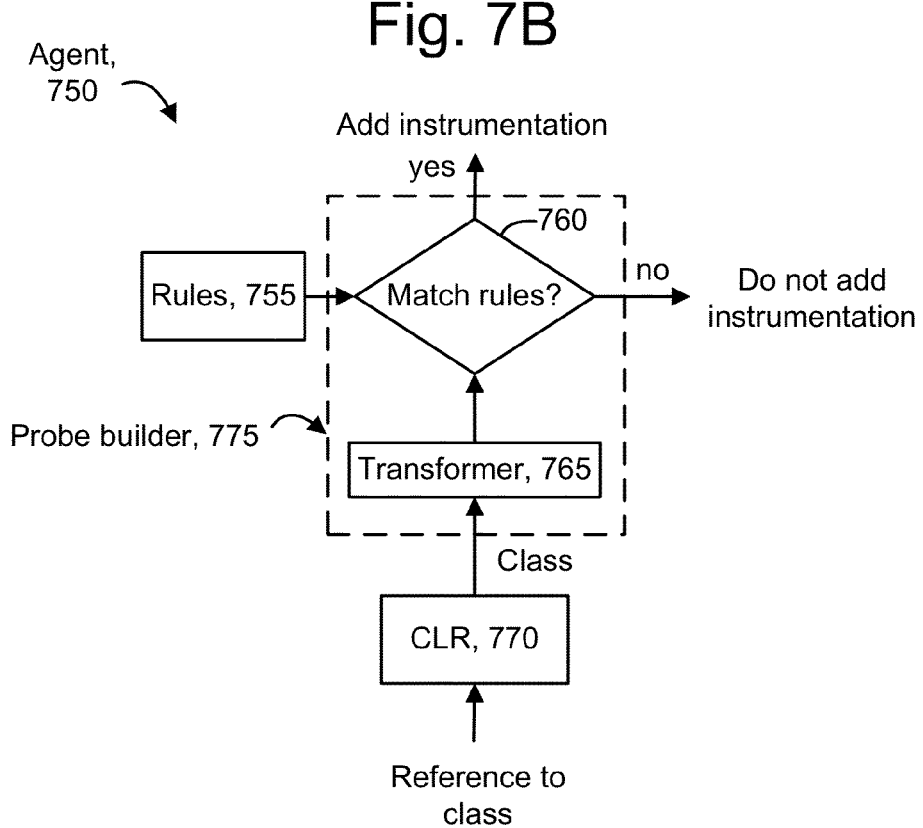
FIG. 7B depicts a .NET-based example process flow for static instrumentation.

FIG. 7B depicts a .NET-based example process flow for static instrumentation. In another possible approach, the components of the managed application are provided according to the MICROSOFT CORP. ".NET" Framework. Unlike JAVA, the .NET framework does not use class loaders. Instead, .NET includes a virtual machine that manages the execution of programs written specifically for the framework. The runtime environment of the .NET framework is known as the Common Language Runtime (CLR). The CLR provides the appearance of an application virtual machine so that programmers need not consider the capabilities of the specific CPU that will execute the program. The CLR also provides other services such as security, memory management, and exception handling. A class library of pre-coded solutions and the CLR together compose the .NET Framework.

Moreover, the CLR is an implementation of a Common Language Infrastructure (CLI) which provides a language-neutral platform for application development and execution, including functions for exception handling, garbage collection, security, and interoperability. The CLI includes the core class libraries, Common Type System, and the Common Intermediate Language (CIL). As with JAVA byte code, CIL is another example of intermediate byte code. JAVA and .NET provide example implementations only, as other implementations are possible.

Here, the process may be implemented by an agent 750, in one possible approach. In one possible scenario, some process in the .NET framework references a class by name, and the CLR 770 finds the class, shows it to a transformer 765 (if any) and uses the resultant CIL. In particular, if the class matches rules 755 at a decision block 760, instrumentation is added. If the class does not match the rules 755 at the decision block 760, instrumentation is not added. The transformer 765 and the decision block 760 may be considered to be part of a probe builder 775.

Figure 8A:
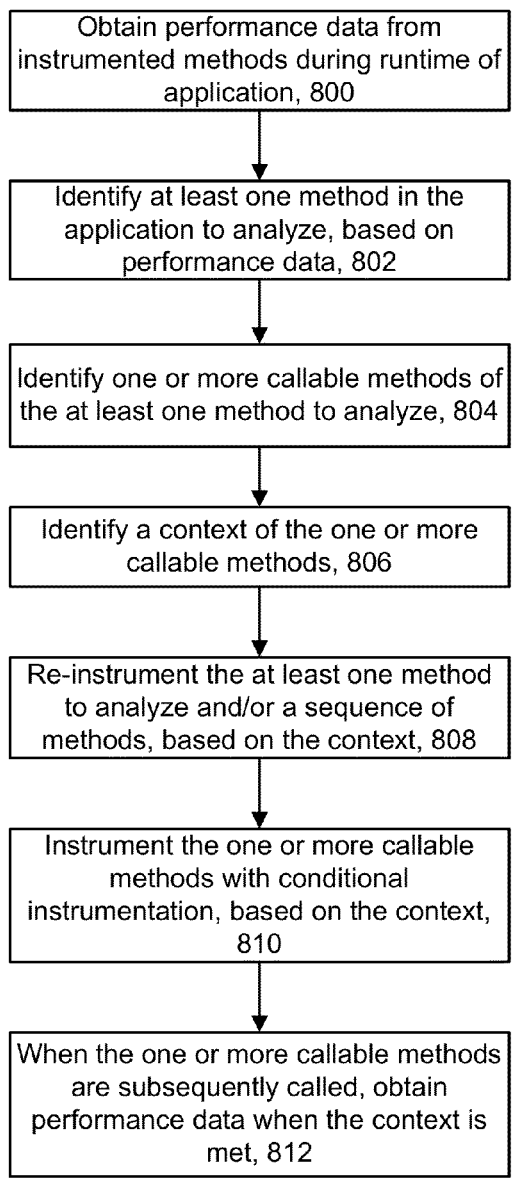
FIG. 8A depicts a method for analyzing software by identifying callable methods and applying conditional instrumentation.

FIG. 8A depicts a method for analyzing software by identifying callable methods and applying conditional instrumentation. In one approach, an agent associated with the software carries out some or all of the steps. As mentioned, the amount of instrumentation should be limited to avoid excessive overhead, so that the ability to understand the operation of an application is limited. In some cases, the source code could be reviewed if it was available to try to diagnose the application, but the source code is usually not available, and is not readily understandable to most users. As a result, the user does not know which additional methods should be instrumented to obtain relevant information for diagnosing the application.

Instead, a deeper understanding and diagnosis of an application can be achieved by selectively discovering callable methods which are currently un-instrumented and would therefore otherwise go unnoticed, in addition to identifying a context in which the callable methods might be called. These additional methods can be instrumented during a diagnosis session, and subsequently the instrumentation can be removed. The techniques provided herein are also useful in adding instrumentation to custom software, where a standard instrumentation package may overlook portions of the code for which instrumentation would be desirable. The agent can use the techniques to discover, on-demand, the portions of code that may be called by a specific method or set of methods. Byte code analysis is used in an example implementation.

Generally, tracing allows users to conduct deep diagnosis of code issues by following a specific user transaction through its execution and reporting the sequence, duration and order of the method executed. Current approaches, however, do not distinguish between execution of methods within the transaction scope and outside of it, leading to overhead and noisy information. Moreover, without context, the relative weight of reported performance metrics for different transactions cannot be determined. Typically, the user starts a transaction trace and detects that some specific kind of transaction, starting with the invocation of a traced method, is having a performance issue. To obtain more information about the issue, the user can apply conditional tracing to the traced method.

Step 800 includes obtaining performance data from instrumented methods during a runtime of an application. This can include methods which are already instrumented, such as based on static rules which determine which methods are to be instrumented when they are loaded into the application, as discussed in connection with FIGS. 7A and 7B. In another approach, the methods may be instrumented after they are loaded into the application. Further details are provided in FIG. 8B.

Step 802 includes identifying at least one selected method in the application to analyze, based on the performance data. For instance, in the example of FIG. 4A, the method to analyze is C4A or C4B. In the example of FIG. 5A, the method to analyze is C6A. Further details are provided in FIG. 8C.

Step 804 includes identifying one or more callable methods of the at least one method to analyze. Further details are provided in FIG. 8D.

Step 806 includes identifying a context of the one or more callable methods. Further details are provided in FIG. 8E.

Step 808 includes re-instrumenting the at least one method to analyze and/or a sequence of components which includes the at least one method least to analyze. Further details are provided in FIG. 8G.

Step 810 includes instrumenting the one or more callable methods with conditional instrumentation, based on the context. Further details are provided in FIG. 8H.

Step 812 includes obtaining performance data from the one or more callable methods when the one or more callable methods are subsequently called during a runtime of the application and the context is met. The performance data is obtained by executing the conditional instrumentation. Further details are provided in FIG. 8I.

Figure 8B:
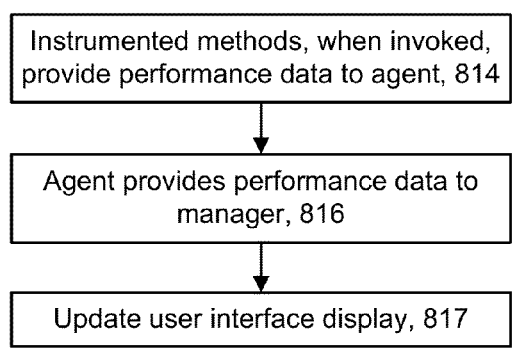
FIG. 8B provides further details of step 800 of FIG. 8A.

FIG. 8B provides further details of step 800 of FIG. 8A. Step 814 includes the instrumented methods, when invoked, providing performance data to an agent. Step 816 includes the agent providing the performance data to a manager. The user interface displays, such as discussed previously, can be updated at step 817.

Figure 8C:
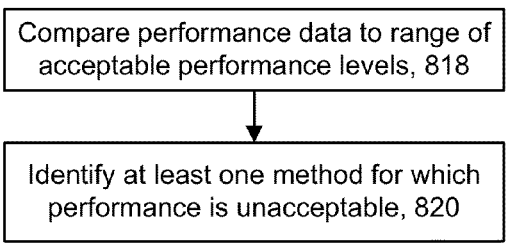
FIG. 8C provides further details of step 802 of FIG. 8A.

FIG. 8C provides further details of step 802 of FIG. 8A. Step 818 compares performance data to a range of acceptable performance levels. Step 816 identifies at least one method for which the performance is unacceptable. Thus, the at least one method to analyze may be identified based on performance data, for instance, which indicates a performance problem with the at least one method. This identification can be performed by continuously monitoring the performance data and providing a report to a user on a user interface, for instance. Performance data which is out of range, based on comparison with preset limits, can be automatically flagged. The user may then manually select one or more methods to instrument. In another possible approach, the process is fully automated, not requiring user intervention, so that an identified method is automatically instrumented when its performance data indicates that its performance is below a specified performance level or is otherwise of interest.

Figure 8D:
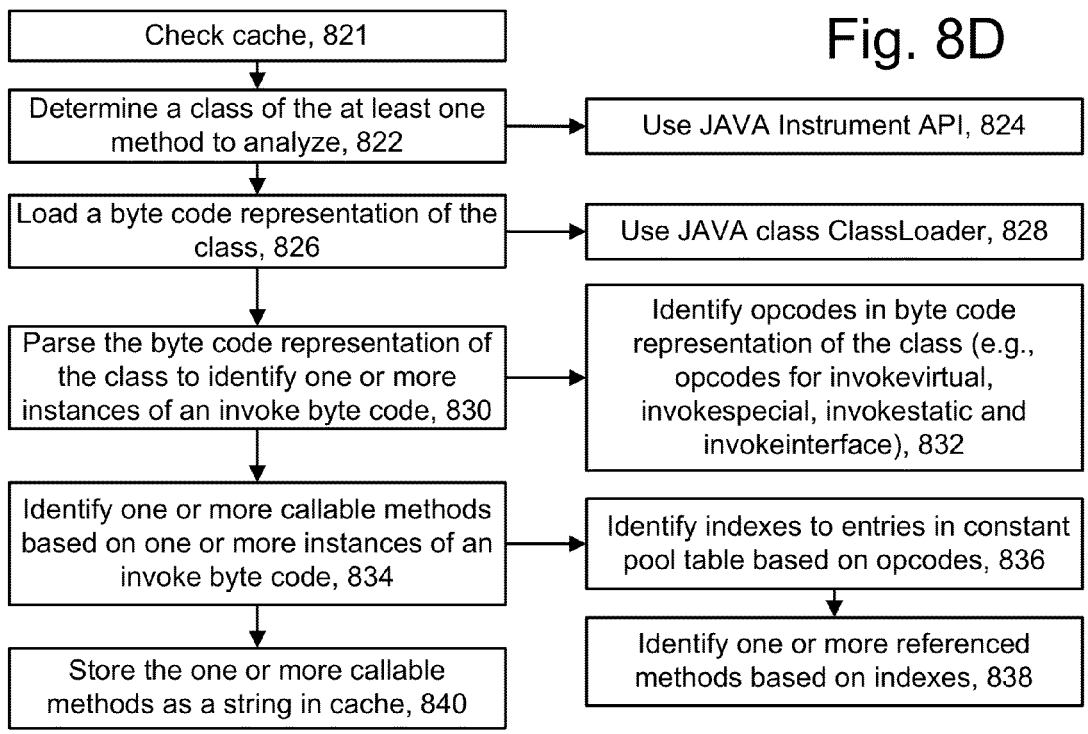
FIG. 8D provides further details of step 804 of FIG. 8A.

FIG. 8D provides further details of step 804 of FIG. 8A. Initially, at step 821, a cache may be checked to determine if method calls of the at least one method to analyze are present. The cache can be within a virtual machine of the agent of the application server in which the application is running, for instance. Generally, the cache may be provided for execution performance. When the application begins executing, the cache is empty. Assume that the at least one method to analyze is called method doSomething( ). The process to retrieve its callable methods begins. The first thing we do is to look into the cache. If the callable methods are not in cache, then steps 822-840 of FIG. 8D are performed to identify the callable methods and store them in cache. Step 840 caches the method calls retrieved for doSomething( ) using the following pseudo-code: cache.put([{classLoader of the class}; {class where the doSomething( ) method is defined}; doSomething( )], [callable method 1, callable method 2 . . . ]); where ([{classLoader of the class}; {class where the doSomething( ) method is defined}; doSomething( )] is the key unequivocally identifying the method doSomething( ), and the callable methods are the identified callable methods for doSomething( ). The next time that the procedure is activated for the method doSomething( ), the cache will contain the information retrieved previously; therefore, we do not need to perform steps 822-838 anymore, because we have the information on the method called in the cache. We retrieve the information by the key described above.

Step 822 determines a class of the at least one method to analyze through reflection. In one possible implementation, this includes using the JAVA application programming interface (API), java.lang.instrument (step 824). The at least one method to analyze may be considered to be an invoking method since it can invoke or call one or more callable methods. Step 822 can include fetching a JAVA class from among all loaded classes in memory, e.g., in the JVM.

Step 826 includes loading a byte code representation of the class, such as from an original resource location from which the byte code was obtained. In an example implementation, the JAVA class ClassLoader is used, if available (step 828). Note that a safety precaution can be enforced to limit the amount of code which is loaded in memory so that very large, automatically generated classes will not overwhelm the memory.

Step 830 includes parsing a byte code representation of each class obtained to identify one or more instances of an invoke byte code. In a particular implementation, this includes identifying specific opcodes (operation codes) in the byte code representation of a class (step 832). For instance, four opcodes in the JAVA language identify a byte code which can invoke another method. Specifically, the opcode for invokevirtual is decimal value 182 or hexadecimal value (0xb6 or b6), the opcode for invokespecial is decimal value 183 or hexadecimal value (0xb7 or b7), the opcode for invokestatic is decimal value 184 or hexadecimal value (0xb8 or b8), and the opcode for invokeinterface is decimal value 185 or hexadecimal value (0xb9 or b9). The presence of any of these opcodes identifies callable methods.

It is also possible to limit step 832 to detecting one or more specified opcodes, but fewer than all possible opcodes. For instance, it may be determined that an interface method is not of interest, in which case only the opcodes for invokevirtual, invokespecial and invokestatic, but not invokeinterface, are detected.

Step 834 identifies one or more callable methods based on the one or more instances of an invoke byte code. In an example implementation, the one or more callable methods are extracted from a constant pool of the class determined at step 822. Specifically, step 836 identifies indexes to entries in a constant pool table based on the opcodes, and step 838 identifies one or more referenced methods based on the indexes. Step 840 stores the one or more callable methods, which are the one or more referenced methods, as a string in cache, e.g., the called methods for doSomething( ). Note that the process of FIG. 8D can be performed separately for each of a number of different methods, at the same time or at different times.

Figure 8E:
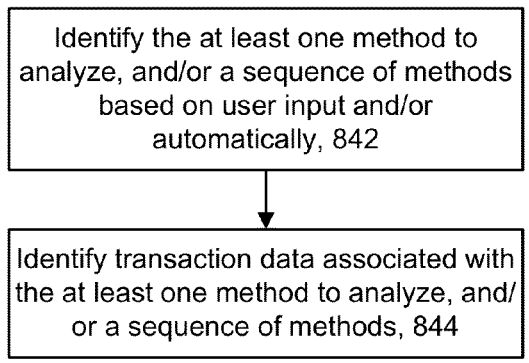
FIG. 8E provides further details of step 806 of FIG. 8A.

FIG. 8E provides further details of step 806 of FIG. 8A. Step 842 includes identifying at least one method to analyze and/or a sequence of methods such as a sequence which includes the at least one method to analyze. This can be done using the same performance data which is reported for use in the region 508 of the user interface display 500 of FIG. 5D. Essentially, each method is known from instrumentation in a sequence of methods which leads up to calling the at least one method to analyze. For example, in FIG. 5D, if C6A is the method to analyze, then by traversing the tree to the next lower level, we see that C6A1, C6A2 and C6A3 are the methods to have conditional instrumentation added. Further, by traversing the tree to each higher level, we see that a sequence of methods which includes the at least one method to analyze could be C5-C6A, when the sequence length is 2 components/methods, C4A-C5-C6A, when the sequence length is 3 components/methods, C3A-C4A-C5-C6A, when the sequence length is 4 components/methods, and so forth. Step 844 includes identifying transaction data associated with the at least one method to analyze, and/or a sequence of methods such as a sequence which includes the at least one method to analyze. In the example provided above, the transaction data may indicate a classification of the user. However, many other types of transaction data are possible. In one possible implementation, the transaction data is in a specified data field which is passed among the methods in one or more applications. For instance, a request from a user may have the data field and value of: UserClass=premium. UserClass=premium can be the transaction data which is examined by the conditional instrumentation. If UserClass=premium, then the context is met. If UserClass=medium or UserClass=regular, the context is not met.

Figure 8F:
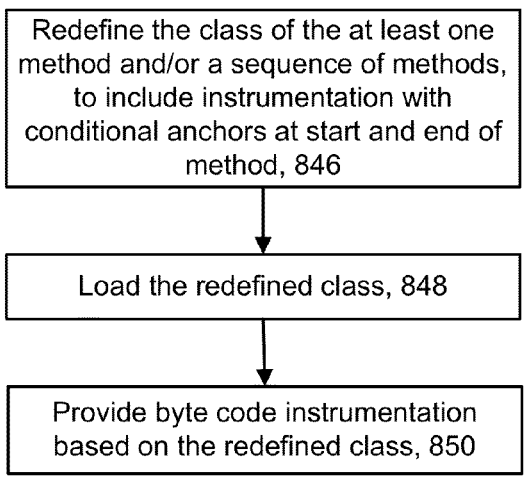
FIG. 8F provides further details of step 808 of FIG. 8A.

FIG. 8F provides further details of step 808 of FIG. 8A. Step 846 includes redefining the class of the at least one method to analyze, and/or a sequence of methods such as a sequence which includes the at least one method to analyze, with conditional anchors at the start and the end of each method. Redefining of classes is discussed further in connection with FIG. 10. Conditional anchors are discussed further in connection with FIGS. 8I and 8J. Step 848 includes loading the one or more redefined classes (see also FIG. 10). Step 850 includes providing byte code instrumentation based on the one or more redefined classes (see also FIG. 10).

Figure 8G:
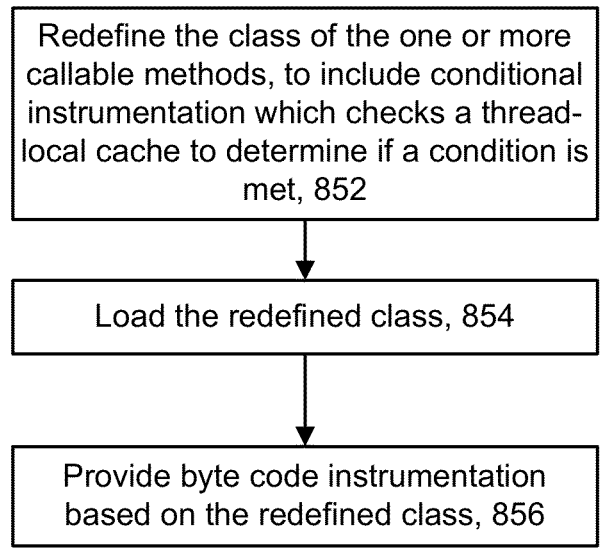
FIG. 8G provides further details of step 810 of FIG. 8A.

FIG. 8G provides further details of step 810 of FIG. 8A. Step 852 includes redefining the class of each of the one or more callable methods, to include conditional instrumentation which checks a memory resource such as a thread-local cache to determine if a condition is met. Step 854 includes loading the one or more redefined classes. Step 856 includes providing byte code instrumentation based on the one or more redefined classes.

Figure 8H:
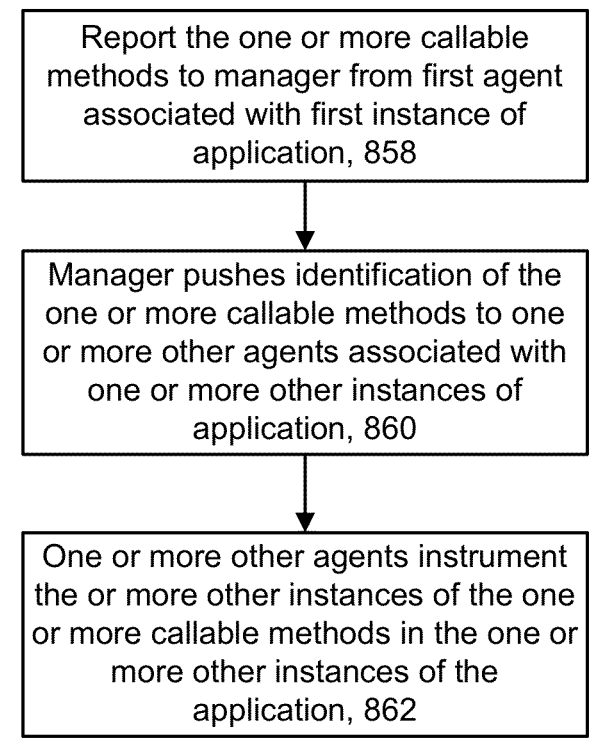
FIG. 8H provides further details of another implementation of step 810 of FIG. 8A.

FIG. 8H provides further details of another implementation of step 810 of FIG. 8A, which can occur in addition to the process of FIG. 8G. As mentioned in connection with FIG. 1, multiple application servers may have respective agents which communicate with a central manager. Thus, the agents can be deployed in a cluster of JVMs that are running application servers that contain separate instances of the same code such as an application. When one agent, such as agent A1 108, analyzes at least one method in an application and determines one or more referenced methods, an identification of the one or more referenced methods can be shared with one or more other agents, such as via the manager 120. For example, the agent A1 (108) may signal to the manager 120 that a new set of method calls, e.g., callable methods, have been retrieved for a given class and method. The manager 120 can then decide to push the information to the other agents in the cluster, such as agent A2 (112), that may be interested. This will avoid unnecessary repetition of the method call detection steps on the other agents, and will allow the agents to gather performance data from different instances of the discovered callable methods. By viewing performance data for the same method across different instances of an application, greater insight can be gained to the operation of the application.

In an example process, step 858 reports the one or more callable methods to a manager from a first agent (108) associated with a first instance of an application. At step 860, the manager pushes an identification of the one or more callable methods to one or more other agents (112) associated with one or more other instances of the application. At step 862, the one or more other agents instrument the one or more other instances of the one or more callable methods in the one or more other instances of the application.

Figure 8I:
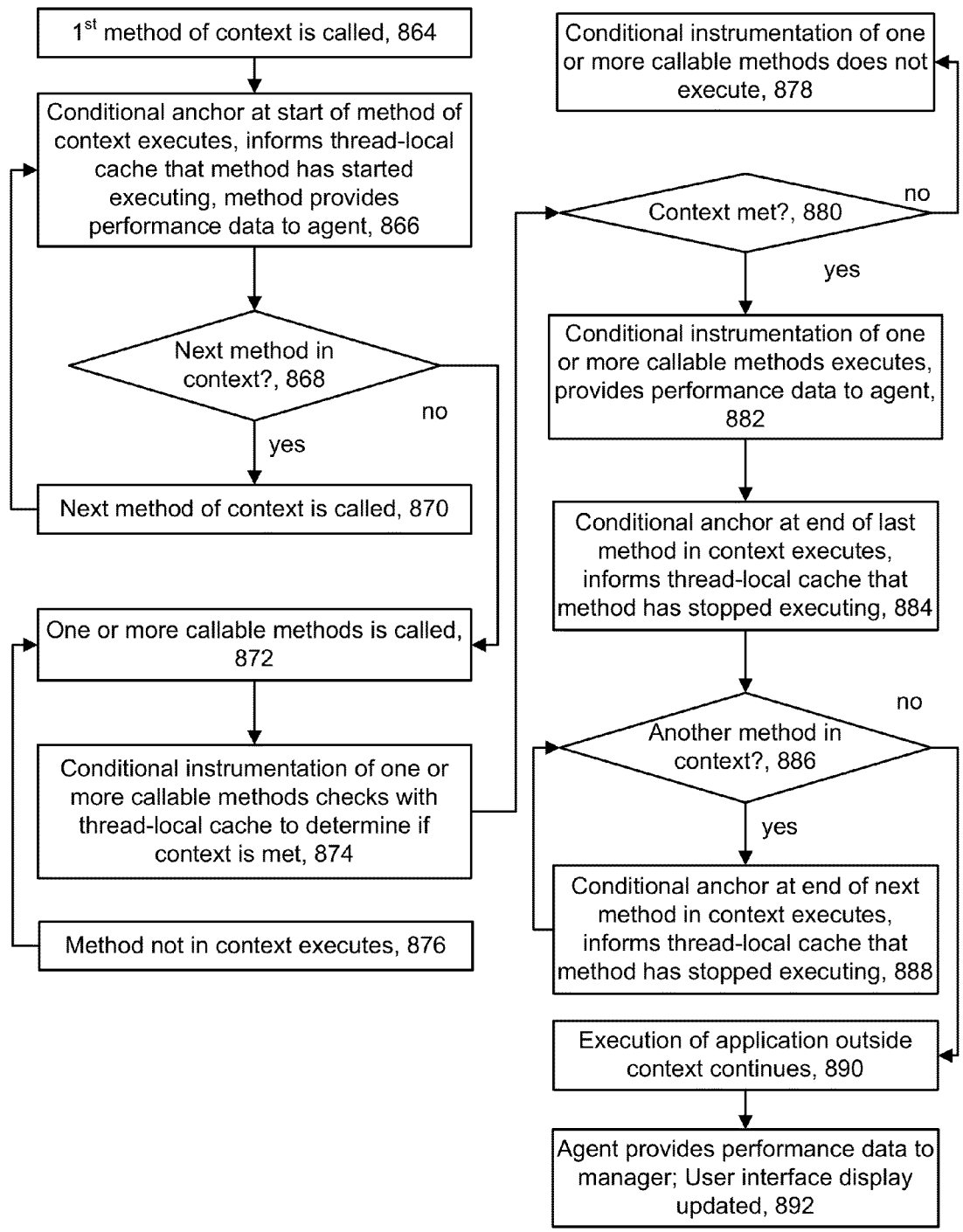
FIG. 8I provides further details of step 812 of FIG. 8A.

FIG. 8I provides further details of step 812 of FIG. 8A. In step 864, a first method of the context is called. In some cases, there may be only one method in the context, such as where the context only requires the method being analyzed to call the method with the conditional instrumentation. In other cases, the context requires a specific sequence or chain of method calls before the method with the conditional instrumentation is called. In step 866, a conditional anchor at the start of the first method of the context executes, informing a thread-local cache that the method has started executing. The first method need not necessarily indicate its position in a sequence of methods in a context (e.g., first, second . . . ). See FIG. 8J for further details. The conditional anchor can be provided by code in instrumentation of the method. The method, via its instrumentation, can also provide performance data to an agent. The performance data may merely indicate that the method has started executing. At decision step 868, if there is a next method in the context, the next method is called at step 870. A conditional anchor at the start of the next method of the context executes, informing a thread-local cache that the method has started executing. If there is no next method in the context at decision step 868, the one or more callable methods is called at step 872. Note that a method being analyzed can call one or multiple methods with conditional instrumentation concurrently.

Step 876, in which a method which is not in the context executes, provides an alternative path to step 872.

At step 874, the conditional instrumentation of the one or more callable methods which are called in step 872 checks with the thread-local cache to determine if the context is met. See also FIG. 8J.

If the context is not met, such as when step 876 is invoked, at decision step 880, the conditional instrumentation of the one or more callable methods does not execute (step 878). If the context is met, at decision step 880, the conditional instrumentation of the one or more callable methods does execute, at step 882, and provides performance data to an agent. Thus, the conditional instrumentation executes to report regarding an execution of the at least one callable method when the conditional instrumentation determines that the at least one callable method is called in the context. Similarly, the conditional instrumentation does not execute to report regarding the execution of the at least one callable method when the conditional instrumentation determines that the at least one callable method is not called in the context.

At step 884, a conditional anchor at the end of the last method in the context executes and informs the thread-local cache that the method has stopped executing. At decision step 886, if there is another method in the context, step 888 is performed in which a conditional anchor at the end of the next method in the context executes and informs the thread-local cache that the method has stopped executing. If there is no next method in the context at decision step 886, then execution of the application outside of the context continues at step 890. This can include, for instance, the agent providing performance data to the manager, or the user interface display being updated, at step 892, although these activities can occur during execution within the context as well.

FIG. 8J depicts activities involving a thread-local cache, consistent with FIGS. 5B and 8I. The thread-local cache can be a memory resource which is available to an application, local to the application for faster access. The thread-local cache can store information which is provided by instrumentation of methods in a context, and provide the information, upon request, to conditional instrumentation. Referring also to FIG. 5B, we have the example of a context which requires the sequence of C4A-C5-C6A for the conditional instrumentation of C6A1. At t6, C4A starts to execute and the conditional anchor/code of the instrumentation of C4A sends a message to the thread-local cache which includes an identifier/name of the method, e.g., MethodName=C4A, and an execution status, e.g., ExecutionStatus=Executing. This information is stored in the thread-local cache as an indication that the method is executing. Similarly, at t7, C5 starts to execute and the conditional anchor/code of the instrumentation of C5 sends a message to the thread-local cache which includes an identifier/name of the method, e.g., MethodName=C5, and an execution status, e.g., ExecutionStatus=Executing. This information is stored in the thread-local cache. At t8, C6A starts to execute and the conditional anchor/code of the instrumentation of C6A sends a message to the thread-local cache which includes an identifier/name of the method, e.g., MethodName=C6A, and an execution status, e.g., ExecutionStatus=Executing. This information is stored in the thread-local cache.

At t9, when C6A1 is called by C6A, the conditional instrumentation of C6A1 sends a request to the thread-local cache to retrieve the execution status for one or more specified methods. This is a request to access, from the memory resource, one or more indications that one or more methods are executing. This request is represented by the pseudocode Retrieve ExecutionStatus for MethodName=C4A. C5 and C6A. The conditional instrumentation of C6A1 accesses this information and uses it to determine if the context is met. Note that, as discussed, transaction data can also be used by the conditional instrumentation of C6A1 to determine if the context is met, additionally or alternatively. In one possible implementation, the transaction data is passed to the conditional instrumentation of C6A1 by C6A so that the conditional instrumentation of C6A1 does not access the transaction data from the thread-local cache. However, it is also possible for the transaction data to be provided by the methods in the context and accessed by the conditional instrumentation to determine whether the context is met. When the conditional instrumentation of C6A1 determines that the context is met, the conditional instrumentation of C6A1 executes to report regarding an execution of the at least one callable method. This execution is based at least partly on the accessed one or more indications from C4A, C5 and C6A.

Subsequently, the methods in the context stop executing in succession. At t16, C6A stops executing and the second conditional anchor/code of the instrumentation of C6A sends a message to the thread-local cache which includes an identifier/name of the method, e.g., MethodName=C6A, and a request to remove/erase the execution status, e.g., Remove ExecutionStatus. Or, a request could be sent to set the execution status to ExecutionStatus=NotExecuting. At t17, C5 stops executing and the second conditional anchor/code of the instrumentation of C5 sends a message to the thread-local cache which includes an identifier/name of the method, e.g., MethodName=C5, and the request Remove ExecutionStatus. At t18, C4A stops executing and the second conditional anchor/code of the instrumentation of C4A sends a message to the thread-local cache which includes an identifier/name of the method, e.g., MethodName=C4A, and the request Remove ExecutionStatus.

The condition anchor is a tracer that is added to the byte code of the traced method in a context, at the start and end of the method. The tracer perform two operations; namely, it stores in the thread-local cache, in a data structure such as a map, the fact that it has been called, when the method is called and starts executing, and removes this information at the end of the method. The overhead incurred by the use of conditional anchors is minimal. In one possible approach, the conditional anchor tracers update a map structure with constant access time. The map is in the thread-local cache, so there is no contention. Similarly, the overhead incurred by the use of conditional instrumentation is minimal.

As an alternative to the thread-local cache, the conditional instrumentation of a method could analyze the call stack at the time of invocation of the method to determine if the context is met. As mentioned, a call stack identifies methods which have been called or invoked during the execution of one or more programs or threads. In this approach, the method determines if the call stack indicates that the context is met. The use of a thread-local cache may be more performing since there is no need to look through the stack, which may result in a significant access time, depending on the depth of the stack.

Figure 9:
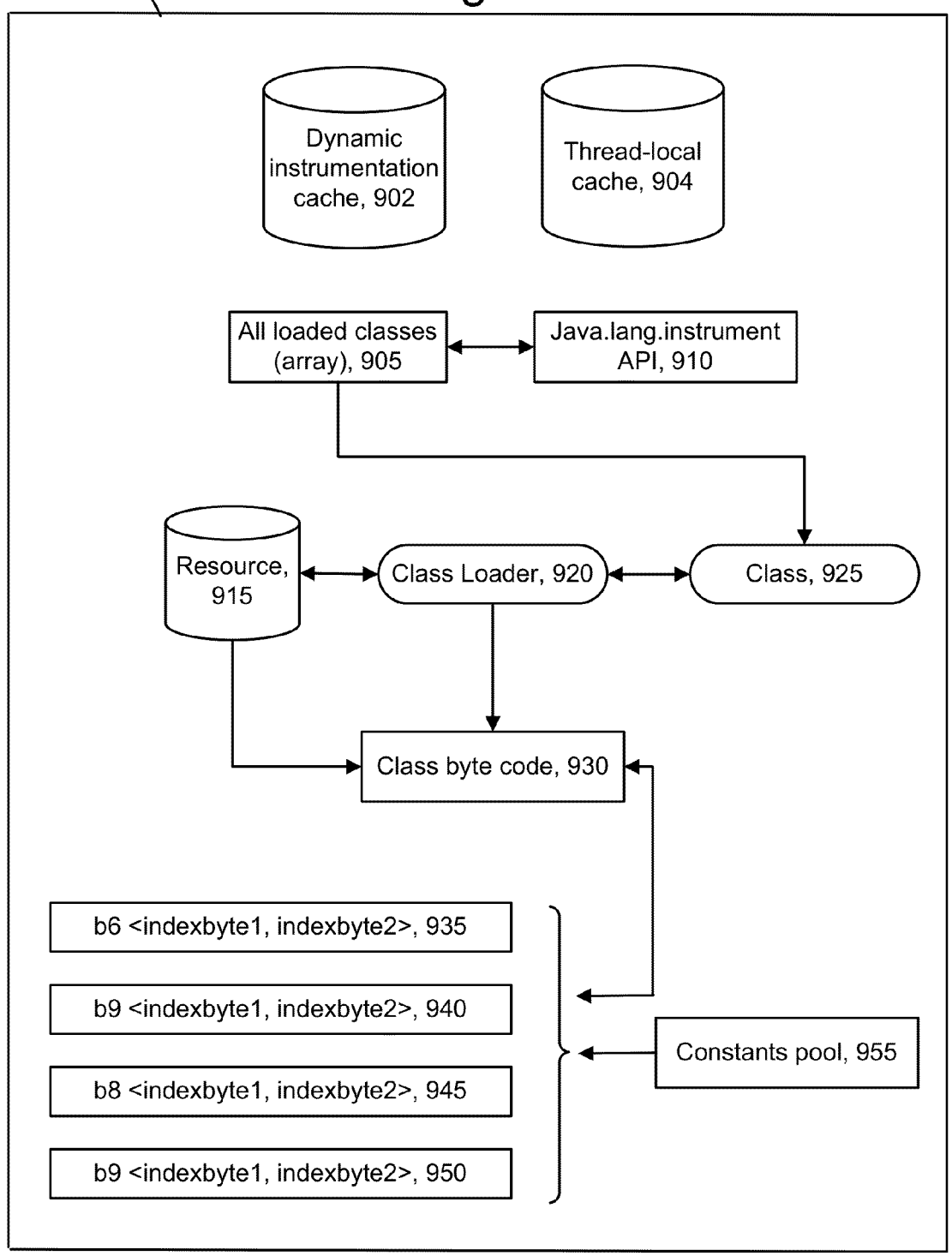
FIG. 9 depicts software and hardware which can be used in connection with the method of FIG. 8A.

FIG. 9 depicts software and hardware, shown collectively at 900, which can be used in connection with the method of FIG. 8D. Hardware includes a dynamic instrumentation cache 902, a thread-local cache 904 (see FIG. 8J), which is a memory resource, and another memory resource 915. A thread-local cache can be a static or global memory resource which is local to a thread. In JAVA, thread-local variables are implemented by the ThreadLocal class. A ThreadLocal object maintains a separate instance of the variable for each thread that calls the object's get or set method.

The dynamic instrumentation cache may store the callable methods which have been identified for a method which is being analyzed. The callable method can then be quickly identified from the cache if a subsequent analysis of the same method is performed, thereby reducing the consumption of computing resources. The resource 915 can be a memory location which is used for storing byte code of different classes of the application which is loaded into memory when the application is instrumented and begins executing. In one possible implementation, the dynamic instrumentation cache 902 and the resource 915 are provided in the memory 240 of FIG. 2 in an application server.

The java.lang.instrument API 910 is used to access all loaded classes 905 to determine a particular class 925 of the at least one method being analyzed, in correspondence with steps 822 and 824 of FIG. 8D. In one approach, all loaded classes are provided in an array. Based on the class 925, a class loader 920 is used to access the resource 915 to load class byte code 930 for the class 925, in correspondence with steps 826 and 828 of FIG. 8D. The class byte code 930 is parsed to identify one or more instance of opcodes 935, 940, 945 and 950, in correspondence with steps 830 and 832 of FIG. 8D. Each opcode can have respective index bytes, <indexbyte1, indexbyte2> which are used to fetch a string of a method call from a constants pool 955, in correspondence with steps 834, 836 and 838 of FIG. 8D.

FIG. 10 depicts an example process flow for instrumenting software. In correspondence with FIG. 5A, a static list of components 1010 can be provided to a class loader 1002, which loads byte code for use by a transformer/probe builder 1000 to provide instrumented byte code. The byte code could optionally be compiled into machine code. For instance, the method defineClass converts an array of bytes into an instance of class Class. Furthermore, discovered components 1006, such as methods discovered by the process of FIG. 8A, can be instrumented. In one approach, a user interface 1008, such as depicted in FIG. 5D, allows the user to designate discovered components to be instrumented. The user can also modify the static list 1010. The user interface may be responsive to a performance monitor 1012, which monitors performance data which is flowing in from the existing instrumentation in the managed application and identify, for instance, the fact that some components are causing a problem in a transaction, such as taking too much time to execute. The performance data can be compared to lower and upper thresholds to determine whether it is out of range.

A discovered component can include a dynamically updatable list of classes which should be instrumented. This list can change from time to time so that particular methods are instrumented for limited periods of time in which diagnosis is performed. The user interface 1008 may specify the time period, or a default time period may be used. Thus, a component can be redefined, so that it transitions, e.g., from not having instrumentation at one point in time, to having instrumentation at another point in time. It is also possible to provide different types or levels of instrumentation, e.g., a high level of instrumentation, in which many aspects of the performance of a component are tracked, and a low level of instrumentation, in which only a few aspects of the performance of a component are tracked. Redefining a component can thus involve a transition to a different type of instrumentation.

Instrumentation can yield many types of performance metrics/data, including an average execution or response time of a component, an invocation rate per second or per interval, a count of invocations, a concurrency metric indicating a number of invocations that have started but not finished per interval, and a stalled metric indicating a number of invocations that have started whose method invocation times have exceeded a specific threshold per interval. Further, the data can identify a garbage collection heap size, a bandwidth metric indicating file and socket activity, a number of threads, system logs, exceptions, memory leaks and component interactions. The data can also identify which components are called by the instrumented component or which call the instrumented component. For instance, in a controller architecture, control flows in through a controller component, which has control over which components are executed next, and knows how often they are executing and how they are performing. The controller component can report, via instrumentation, on which un-instrumented components are being frequently invoked and therefore are perhaps of interest and should be redefined to add instrumentation.

As mentioned, it is possible to redefine a component to change its type of instrumentation. For example, more instrumentation may be added when the existing instrumentation detects a problem, e.g., due to one or more parameters being out of bounds. Also, the additional instrumentation may be subsequently removed when the instrumentation establishes that a normal condition has returned. The removal could be performed based on a user command, or automatically, without user intervention.

Note that the discovered components 1006, user interface 1008, static list of components 1010 and performance monitor 1012 can be provided at the same location or at different locations. For example, the user interface 1008 can be provided at the user interface host 122 (FIG. 1), the discovered components 1006 and the static list of component 1010 can be provided at the application server 106 or 110, and the performance monitor 1012 may be associated with the manager 120, which receives performance data from the agents 108 and 112 at the application servers 106 and 110, respectively.

The performance monitor 1012 provides an idea of what components are involved in a problem transaction and can determine whether these components could be causing, or are causing, issues, and identify this information on the user interface 1008.

The user interface 1008 allows a user to manually pick and choose which components, including the discovered components, are to be instrumented or not instrumented, for instance. The type of instrumentation, when different types are available, could also be specified via the user interface.

The static list of components 1010 may include classes or other components which are to be instrumented when the application begins running. This may be a baseline list of components which are expected to yield important data. In one approach, a list of the discovered components 1006 can be persisted so that the next time the system starts up, the same components are instrumented. This allows the user to have constant data, reporting and performance data from a component, and provides a good way to allow the user to set up the environment.

A component can be redefined in different ways according to whether the component has already been incorporated into the application at runtime. If a component is not already incorporated into the application, it can be incorporated normally by being loaded by the class loader 1002 such as in a JVM, in one possible implementation. In other implementations, such as those which use the .NET framework, a class loader is not used.

When a component is loaded, the transformer/probe builder 1000 instruments the component if instructed, e.g., in response to the user interface 1008, discovered components 1006, static list of component 1010 and performance monitor 1012. A component which is already incorporated into the application, but is not instrumented, can be reincorporated into the application with instrumentation. For example, the component can be removed from the application and reloaded during the runtime without restarting the virtual machine. To achieve this, the JAVA redefineClass command is provided to the class loader 1002 with the component. The JAVA DEVELOPMENT KIT (JDK) version 1.5 or higher has a redefinition capability which uses this command. This command redefines a supplied set of classes using supplied class files. It operates on a set in order to allow interlocked changes to more than one class at the same time. Moreover, if a redefined method has active stack frames, those active frames continue to run the byte codes of the original method, and the redefined method will be used on new invokes.

Redefining a component such as a class is analogous to restarting the virtual machine but only for that class. When a class is redefined, if the class is already in existing method stacks, it stays there. But, for every new method invocation, the new class is used. That is, once it is redefined, the new version is picked up.

When the transformer/probe builder 1000 receives the redefined component, it instruments the component, if instructed to do so. The transformer/probe builder 1000 could also add a specified type of instrumentation to the component.

After a discovered component has been instrumented and reincorporated into the application, and the instrumentation is no longer need for diagnosis, the component can be reincorporated into the application again, but without instrumentation. This removal of instrumentation can be based on a user command, a time out after a specified diagnosis period or other some other event. For instance, the performance monitor 1012 may determine that performance data of the discovered component has been acceptable for a certain period of time or for number of invocations of the component. That is, the performance monitor 1012 may determine that performance data of at least one method of the instrumented methods no longer fails to meet a threshold performance level. In response, the performance monitor 1012 can issue a command, such as redefineClass, to remove the instrumentation.

The adding and removal of instrumentation can be done dynamically at runtime so that the virtual machine in which the byte code is executing does not have to be brought down, and data from the instrumented components can be accessed immediately (in the case of adding instrumentation).

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented method comprising the computer-implemented steps of:
    obtaining performance data from instrumented methods in an application;
    based on the performance data, selecting a method of the instrumented methods as a selected instrumented method to analyze in further detail;

based on the selecting, determining a callable method which can be called by the selected instrumented method and which is un-instrumented; and in response to the determining, providing conditional instrumentation for the callable method, wherein the conditional instrumentation-specifies a context in which the callable method can be called, the context requires the callable method to be called by the selected instrumented method and the conditional instrumentation is configured to determine that that the selected instrumented method is executing when the callable method is called.

2. The computer-implemented method of claim 1, wherein, when the callable method is subsequently called:

the conditional instrumentation executes to report regarding an execution of the callable method when the conditional instrumentation determines that the callable method is called in the context.

3. The computer-implemented method of claim 1, wherein:

the conditional instrumentation is executed to report regarding an execution of the callable method when the callable method is subsequently called, based on determining that the callable method is subsequently called in a transaction in which a specified data object is provided in a header of an inter-component message.

4. The computer-implemented method of claim 1, wherein:

the context requires the callable method to be called in a call sequence which comprises the selected instrumented method and a parent method of the selected instrumented method, and the conditional instrumentation is configured to determine that that the selected instrumented method and the parent method are executing when the callable method is called.

5. A computer-implemented method comprising the computer-implemented steps of:

configuring code of an application with a baseline set of instrumented components comprising instrumented methods, the code of the application also comprises un-instrumented methods;

while executing the code of the application in a computer system, obtaining performance data from the instrumented methods;

based on the performance data, selecting one of the instrumented methods as a selected instrumented method to analyze in further detail;

based on the selecting, determining a callable method of the un-instrumented methods which can be called by the selected instrumented method; and in response to the determining, configuring the code of the application with conditional instrumentation for the callable method, wherein the conditional instrumentation specifies a context in which the conditional instrumentation will be activated when the callable method is called, the context comprises the callable method being called by the selected instrumented method; and while executing the code of the application with the conditional instrumentation in the computer system, when the callable method is called, determining that the callable method is called in the context, the determining that the callable method is called in the context comprises determining that the selected instrumented method is executing when the callable method is called, and in response to the determining that the callable method is called in the context, activating the conditional instrumentation to obtain performance data from the callable method.

6. The computer-implemented method of claim 5, further comprising:

providing a user interface display which allows a user to provide a command to at least one of: (a) provide the conditional instrumentation for the callable method, or (b) remove the conditional instrumentation for the callable method.

7. The computer-implemented method of claim 5, wherein:

the configuring code of the application with the baseline set of instrumented components comprises loading the code of the application into a virtual machine and adding probes to the code of the application; and the configuring the code of the application with conditional instrumentation for the callable method comprises reloading code of the application for the callable method into the virtual machine and adding probes to the code of the application for the callable method.

8. The computer-implemented method of claim 5, wherein:

the configuring the code of the application with conditional instrumentation for the callable method comprises redefining a class of the callable method to include conditional instrumentation, and loading the redefined class into a virtual machine.

9. The computer-implemented method of claim 5, wherein:

the performance data of the instrumented methods includes start and stop times of the instrumented methods; and the performance data from the callable method comprises start and stop times of the callable method.

10. The computer-implemented method of claim 5, wherein:

the selecting the one of the instrumented methods to analyze in further detail occurs based on a user command via a user interface.

11. The computer-implemented method of claim 5, wherein:

the conditional instrumentation is provided dynamically for the callable method during a runtime of the application.

12. The computer-implemented method of claim 5, wherein:

the code of the application with conditional instrumentation is executed to perform a transaction for a user, and the conditional instrumentation identifies specific transaction data which is required to satisfy the context, the specific transaction data comprises at least one of: type of product ordered, identity of product vendor, class of user making a purchase, whether the application is accessed via a specified portal, geographic location of the user, payment mode, or product shipping mode.

13. The computer-implemented method of claim 5, wherein:

the code of the application with conditional instrumentation is executed to perform a transaction for a user, and the conditional instrumentation identifies specific transaction data which is required to satisfy the context, the specific transaction data comprises a specific value of a data object in a header of an inter-component message.

14. The computer-implemented method of claim 5, further comprising:

modifying instrumentation of the selected instrumented method to cause the selected instrumented method to report to a memory resource when the selected instrumented method starts and stops executing, the determining that the selected instrumented method is executing when the callable method is called comprises accessing the memory resource.

15. The computer-implemented method of claim 14, wherein:
the memory resource comprises a thread-local cache.

16. The computer-implemented method of claim 14, wherein:
the conditional instrumentation identifies a sequence of methods which is required to be executing to satisfy the context, the sequence of methods includes the selected instrumented method and a parent method of the selected instrumented method; and
the determining that the callable method is called in the context comprises the conditional instrumentation accessing the memory resource to determine whether that sequence of methods is executing.

17. The computer-implemented method of claim 16, further comprising:
providing a user interface display which allows a user to specify a length of the sequence of methods.

18. A tangible computer-readable storage device having computer readable software embodied thereon for programming a processor to perform a method, the method comprising:
configuring code of an application with a baseline set of instrumented components comprising instrumented methods, the code of the application also includes un-instrumented methods;
while executing the code of the application in a computer system, obtaining performance data from the instrumented methods;
based on the performance data, selecting one of the instrumented methods as a selected instrumented method to analyze in further detail;
based on the selecting, determining a callable method of the un-instrumented methods which can be called by the selected instrumented method;
in response to the determining, configuring the code of the application with conditional instrumentation for the callable method, wherein the conditional instrumentation specifies a context in which the conditional instrumentation will be activated when the callable method is called, the context includes the callable method being called by the selected instrumented method; and
while executing the code of the application with the conditional instrumentation in the computer system, when the callable method is called, determining that the callable method is called in the context, and in response to the determining that the callable method is called in the context, activating the conditional instrumentation to obtain performance data from the callable method, wherein the code of the application with conditional instrumentation is executed to perform a transaction for a user, and the conditional instrumentation identifies specific transaction data which is required to satisfy the context, the specific transaction data comprises a specific value of a data object in a header of an inter-component message.

19. The computer-implemented method of claim 14, wherein:
the memory resource comprises a thread-local cache.

20. The computer-implemented method of claim 1, wherein:
instrumentation of the selected instrumented method reports to a memory resource when the selected instrumented method starts and stops executing, and the conditional instrumentation is configured to access the memory resource to determine that that the selected instrumented method is executing when the callable method is called.

* * * * *